United States Patent
Heide et al.

(10) Patent No.: US 12,470,683 B1
(45) Date of Patent: Nov. 11, 2025

(54) FLOW-GUIDED ONLINE STEREO RECTIFICATION

(71) Applicant: Torc Robotics, Inc., Blacksburg, VA (US)

(72) Inventors: Felix Heide, New York City, NY (US); Anush Kumar, Austin, TX (US); Shile Li, Munich (DE); Omid Hosseini Jafari, Munich (DE); Fahim Mannan, Toronto (CA)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/817,540

(22) Filed: Aug. 28, 2024

Related U.S. Application Data

(60) Provisional application No. 63/667,026, filed on Jul. 2, 2024.

(51) Int. Cl.
| | |
|---|---|
| *H04N 13/246* | (2018.01) |
| *G06V 10/44* | (2022.01) |
| *G06V 10/74* | (2022.01) |
| *G06V 10/771* | (2022.01) |
| *H04N 13/239* | (2018.01) |

(52) U.S. Cl.
CPC ......... *H04N 13/246* (2018.05); *G06V 10/44* (2022.01); *G06V 10/761* (2022.01); *G06V 10/771* (2022.01); *H04N 13/239* (2018.05)

(58) Field of Classification Search
None
See application file for complete search history.

(56) References Cited

U.S. PATENT DOCUMENTS

| | | | |
|---|---|---|---|
| 10,832,062 B1* | 11/2020 | Evans | G06V 10/761 |
| 2019/0004533 A1* | 1/2019 | Huang | G01S 17/86 |
| 2020/0025935 A1* | 1/2020 | Liang | G06V 20/64 |
| 2020/0103909 A1* | 4/2020 | Feinson | G05D 1/0238 |

(Continued)

OTHER PUBLICATIONS

Arnold et al., "Map-free Visual Relocalization: Metric Pose Relative to a Single Image", European Conference on Computer Vision, 2022, pp. 1-18.

(Continued)

*Primary Examiner* — Daniel T Tekle
(74) *Attorney, Agent, or Firm* — Armstrong Teasdale LLP

(57) ABSTRACT

An autonomy computing system and a method of an autonomous vehicle for rectifying stereo images includes a memory storing computer executable instructions and a processor coupled to the memory, the processor, upon execution of the computer executable instructions, configured to: receive an image pair captured using respective cameras in the stereo camera pair; predict a rotation matrix between the first image and the second image by: extracting a first feature map and a second feature map; applying positional feature enhancement on the feature maps to derive a pair of enhanced feature maps; computing a correlation volume across the enhanced feature maps; determining a set of likely matches between the enhanced feature maps; computing a predicted relative pose; and computing the rotation matrix. The system and method further include calibrating the stereo camera pair to rectify the first image and the second image based on the rotation matrix.

20 Claims, 34 Drawing Sheets

(56) References Cited

U.S. PATENT DOCUMENTS

| | | | | |
|---|---|---|---|---|
| 2021/0379992 | A1* | 12/2021 | Domeyer | B60Q 1/547 |
| 2021/0380137 | A1* | 12/2021 | Domeyer | G06V 20/56 |
| 2022/0214457 | A1* | 7/2022 | Liang | G06N 3/04 |
| 2023/0306718 | A1* | 9/2023 | Revaud | G06T 3/40 |
| 2024/0282105 | A1* | 8/2024 | Bharathwaj | G06V 20/188 |

OTHER PUBLICATIONS

Ayache et al., "Rectification of images for binocular and trinocular stereovision", 9th International Conference on Pattern Recognition, 1988, 1, pp. 1-32.

Brachmann et al., "DSAC-Differentiable RANSAC for Camera Localization", 2017 IEEE Conference on Computer Vision and Pattern Recognition (CVPR), 2016, pp. 6684-6692.

Chen et al., "Wide-Baseline Relative Camera Pose Estimation with Directional Learning", 2021 IEEE/CVF Conference on Computer Vision and Pattern Recognition (CVPR), 2021, pp. 3258-3268.

Dang et al., "Continuous Stereo Self-Calibration by Camera Parameter Tracking", IEEE Transactions on Image Processing, 2009, 18(7), pp. 1536-1550.

En et al., "RPNet: An End-to-End Network for Relative Camera Pose Estimation", ECCV Workshops, 2018, pp. 1-8.

Fusiello et al., "Quasi-Euclidean uncalibrated epipolar rectification", 19th International Conference on Pattern Recognition, 2008, pp. 1-4.

Georgiev et al., "A fast and accurate re-calibration technique for misaligned stereo cameras", IEEE International Conference on Image Processing, 2013, pp. 1-5.

Gluckman et al., "Rectifying Transformations That Minimize Resampling Effects", Proceedings of the 2001 IEEE Computer Society Conference on Computer Vision and Pattern Recognition (CVPR), 2001, pp. 1111-1117.

Hansen et al., "Online Continuous Stereo Extrinsic Parameter Estimation", 2012 IEEE Conference on Computer Vision and Pattern Recognition, 2012, pp. 1-8.

Hartley, "Theory and Practice of Projective Rectification", International Journal of Computer Vision, 1999, 35, pp. 1-19.

Ji et al., "Deep View Morphing", 2017 IEEE Conference on Computer Vision and Pattern Recognition (CVPR), 2017, pp. 1-28.

Kendall et al., "PoseNet: A Convolutional Network for Real-Time 6-DOF Camera Relocalization", 2015 IEEE International Conference on Computer Vision (ICCV), 2015, pp. 2938-2946.

Kendall et al., "Geometric loss functions for camera pose regression with deep learning", 2017 IEEE Conference on Computer Vision and Pattern Recognition (CVPR), 2017, pp. 5974-5983.

Laskar et al., "Camera Relocalization by Computing Pairwise Relative Poses Using Convolutional Neural Network", 2017 IEEE International Conference on Computer Vision Workshops (ICCVW), 2017, pp. 929-938.

Li et al., "Practical Stereo Matching via Cascaded Recurrent Network with Adaptive Correlation", 2022 IEEE/CVF Conference on Computer Vision and Pattern Recognition (CVPR), 2022, pp. 16263-16272.

Ling et al., "High-Precision Online Markerless Stereo Extrinsic Calibration", 2016 IEEE/RSJ International Conference on Intelligent Robots and Systems (IROS), 2016, pp. 1771-1778.

Loop et al., "Computing Rectifying Homographies for Stereo Vision", 1999 IEEE Computer Society Conference on Computer Vision and Pattern Recognition, 1999, 1, pp. 125-131.

Luo et al., "Unsupervised Learning of Depth Estimation from Imperfect Rectified Stereo Laparoscopic Images", Computers in biology and medicine, 2021, 140, pp. 1-20.

Mallon et al., "Projective Rectification from the Fundamental Matrix", Image Vis Comput, 2005, 23, pp. 1-16.

Melekhov et al., "Relative Camera Pose Estimation Using Convolutional Neural Networks", ArXiv, 2017, pp. 1-12.

Parameshwara et al., "DiffPoseNet: Direct Differentiable Camera Pose Estimation", 2022 IEEE/CVF Conference on Computer Vision and Pattern Recognition (CVPR), 2022, pp. 6845-6854.

Sarlin et al., "SuperGlue: Learning Feature Matching with Graph Neural Networks", CoRR, 2019, pp. 1-17.

Wang et al., "A Practical Stereo Depth System for Smart Glasses", ArXiv, 2022, pp. 1-11.

Wang et al., "Stereo Rectification Based on Epipolar Constrained Neural Network", 2021 IEEE International Conference on Acoustics, Speech, and Signal Processing (ICASSP), 2021, pp. 2105-2109.

Xiao et al., "DSR: Direct Self-rectification for Uncalibrated Dual-lens Cameras", 2018 International Conference on 3D Vision (3DV), 2018, pp. 1-9.

Zhang et al., "End-to-end learning of self-rectification and self-supervised disparity prediction for stereo vision", Neurocomputing, 2022, 494, pp. 308-319.

Zilly et al., "Joint Estimation of Epipolar Geometry and Rectification Parameters using Point Correspondences for Stereoscopic TV Sequences", Proceedings of 3DPVT, 2010, pp. 1-7.

\* cited by examiner

| Dataset | Method | MAE | SIFT Offset (pixels) | SuperGlue Offset (pixels) | Vertical Flow (pixels) |
|---|---|---|---|---|---|
| (a) Semi-Truck Highway | Unrectified | 0.23 | 8.23 | 8.03 | 3.25 |
| | GT (Offline Calibration) | — | 2.93 | 0.77 | 1.34 |
| | SIFT + LO-RANSAC | 0.26 | 21.10 | 17.61 | 18.11 |
| | SuperGlue + MAGSAC | 0.15 | 14.97 | 11.86 | 12.10 |
| | LOFTR + MAGSAC | 0.15 | 12.93 | 11.87 | 11.95 |
| | RPNet | 0.18 | 12.10 | 9.19 | 9.39 |
| | DirectionNet | 0.28 | 8.41 | 6.10 | 6.44 |
| | ViTPose | 0.07 | 4.53 | 2.37 | 2.83 |
| | Ours (w/o OF) | 0.023 | 3.13 | 0.97 | 1.43 |
| | Ours (w/ OF) | 0.015 | 2.67 | 0.59 | 1.05 |
| (b) KITTI | Unrectified | 0.31 | 16.55 | 8.25 | 9.5 |
| | GT | — | 1.65 | 0.43 | 0.33 |
| | SIFT + LO-RANSAC | 0.08 | 1.82 | 0.63 | 0.61 |
| | SuperGlue + MAGSAC | 0.04 | 2.85 | 1.67 | 1.69 |
| | LOFTR + MAGSAC | 0.06 | 2.14 | 0.97 | 0.86 |
| | RPNet | 0.06 | 1.74 | 0.89 | 0.52 |
| | DirectionNet | 0.06 | 2.13 | 0.94 | 0.94 |
| | ViTPose | 0.03 | 1.95 | 0.71 | 0.73 |
| | Ours (w/o OF) | 0.015 | 1.73 | 0.53 | 0.51 |
| | Ours (w/ OF) | 0.011 | 1.44 | 0.36 | 0.28 |
| (c) Carla | Unrectified | 0.27 | 13.72 | 13.76 | 14.17 |
| | GT | 0.11 | 3.23 | 0.45 | 0.49 |
| | SIFT + LO-RANSAC | 0.073 | 3.6 | 0.82 | 1.23 |
| | SuperGlue + MAGSAC | 0.075 | 5.77 | 2.86 | 3.21 |
| | LOFTR + MAGSAC | 0.13 | 7.29 | 4.53 | 4.52 |
| | RPNet | 0.13 | 7.72 | 5.82 | 5.53 |
| | DirectionNet | 0.133 | 13.47 | 10.84 | 11.12 |
| | ViTPose Ours (w/o OF) | 0.06 | 4.34 | 1.45 | 1.72 |
| | Ours (w/ OF) | 0.13 | 7.68 | 5.53 | 5.67 |
| | | 0.05 | 3.55 | 0.64 | 1.003 |

FIG. 11

| Method | Inference time (*msec*) |
|---|---|
| SIFT + LO-RANSAC | 338 |
| SuperGlue + MAGSAC | 106 |
| LOFTR + MAGSAC | 173 |
| RPNet | 577 |
| DirectionNet | 556 |
| ViTPose | 88 |
| Ours | 86 |

| Ablation | MAE | SIFT Offset (pixels) | SuperGlue Offset (pixels) | Vertical Flow (pixels) | Inference Time (msec) |
|---|---|---|---|---|---|
| w/o Feature Enhancement | 0.15 | 8.47 | 6.88 | 6.82 | 41 |
| w/o Feature Rectification | 0.14 | 8.32 | 6.88 | 6.75 | 79 |
| w/o Optical Flow | 0.13 | 7.68 | 5.53 | 5.67 | 86 |
| w/o Cost Volume | 0.06 | 3.92 | 0.98 | 1.33 | 44 |
| Proposed Model | 0.05 | 3.55 | 0.64 | 1.003 | 86 |
| w/ Reduced Image Resolution | 0.08 | 3.98 | 1.07 | 1.39 | 36 |

FIG. 16

| Dataset | Method | $R_x$ (degrees) | $R_y$ (degrees) | $R_z$ (degrees) |
|---|---|---|---|---|
| (a) Semi-Truck Highway | SIFT + LO-RANSAC | 6.64 | 5.37 | 10.15 |
| | SuperGlue + MAGSAC | 0.79 | 0.46 | 0.18 |
| | LOFTR + MAGSAC | 0.69 | 3.05 | 0.50 |
| | RPNet | 0.62 | 1.16 | 0.49 |
| | DirectionNet | 0.37 | 3.6 | 0.47 |
| | ViTPose | 0.15 | 0.16 | 0.11 |
| | Ours (w/o OF) | 0.03 | 0.05 | 0.04 |
| | Ours (w/ OF) | 0.02 | 0.02 | 0.01 |
| (b) KITTI | SIFT + LO-RANSAC | 2.18 | 1.51 | 2.66 |
| | SuperGlue + MAGSAC | 0.19 | 0.11 | 0.03 |
| | LOFTR + MAGSAC | 0.10 | 0.10 | 0.02 |
| | RPNet | 0.08 | 0.28 | 0.03 |
| | DirectionNet | 0.08 | 0.19 | 0.12 |
| | ViTPose | 0.05 | 0.09 | 0.06 |
| | Ours (w/o OF) | 0.02 | 0.05 | 0.004 |
| | Ours (w/ OF) | 0.03 | 0.003 | 0.008 |
| (c) CARLA | SIFT + LO-RANSAC | 3.32 | 1.80 | 2.85 |
| | SuperGlue + MAGSAC | 0.29 | 0.11 | 0.03 |
| | LOFTR + MAGSAC | 0.45 | 0.14 | 0.14 |
| | RPNet | 0.55 | 0.66 | 0.66 |
| | DirectionNet | 1.10 | 0.80 | 0.76 |
| | ViTPose | 0.12 | 0.16 | 0.29 |
| | Ours (w/o OF) | 0.55 | 0.53 | 0.52 |
| | Ours (w/ OF) | 0.03 | 0.23 | 0.11 |

FIG. 18

| Dataset | Method | MAE | SIFT Offset (pixels) | SuperGlue Offset (pixels) | Vertical Flow (pixels) |
|---|---|---|---|---|---|
| | Unrectified | 0.26 | 8.00 | 2.56 | 4.52 |
| | GT (Offline Calibration) | - | 2.93 | 0.79 | 0.69 |
| | SIFT + LO-RANSAC | 0.32 | 13.76 | 26.50 | 17.74 |
| | SuperGlue + MAGSAC | 0.16 | 13.73 | 11.01 | 11.35 |
| (a) Noon | LOFTR + MAGSAC | 0.17 | 14.12 | 11.34 | 11.49 |
| | RPNet | 0.20 | 11.15 | 8.39 | 8.66 |
| | DirectionNet | 0.33 | 7.68 | 5.36 | 5.76 |
| | ViTPose | 0.07 | 4.39 | 2.29 | 2.80 |
| | Ours | 0.018 | 2.70 | 0.59 | *1.09* |
| | Unrectified | 0.21 | 7.64 | 2.23 | 4.89 |
| | GT (Offline Calibration) | - | 3.17 | 0.76 | 0.71 |
| | SIFT + LO-RANSAC | 0.30 | 16.31 | 34.56 | 18.32 |
| | SuperGlue + MAGSAC | 0.13 | 16.31 | 12.82 | 12.94 |
| (b) Dusk | LOFTR + MAGSAC | 0.13 | 16.6 | 13.2 | 12.95 |
| | RPNet | 0.17 | 12.88 | 9.52 | 9.79 |
| | DirectionNet | 0.25 | 8.78 | 6.13 | 6.53 |
| | ViTPose | 0.05 | 4.47 | 2.07 | 2.63 |
| | Ours | 0.013 | 2.88 | 0.56 | *1.13* |
| | Unrectified | 0.15 | 14.11 | 9.10 | 9.83 |
| | GT (Offline Calibration) | - | 2.78 | 0.71 | 0.41 |
| | SIFT + LO-RANSAC | 0.16 | 17.47 | 20.76 | 17.39 |
| | SuperGlue + MAGSAC | 0.12 | 17.47 | 13.97 | 14.22 |
| (c) Night | LOFTR + MAGSAC | 0.11 | 19.42 | 15.74 | 16.32 |
| | RPNet | 0.12 | 15.89 | 12.61 | 12.59 |
| | DirectionNet | 0.16 | 11.14 | 9.20 | 9.82 |
| | ViTPose | 0.07 | 5.71 | 4.8 | 4.03 |
| | Ours | 0.010 | 2.64 | 0.68 | *0.77* |

FIG. 19

| Stereo Model | Depth Range | Method | lower is better | | | | higher is better | | |
|---|---|---|---|---|---|---|---|---|---|
| | | | MAE | RMSE | SILog | absrel | $d<1.25$ | $d<1.25^2$ | $d<1.25^3$ |
| DLNR | [0, 80]m | DirectionNet | 22.81 | 27.57 | 42.33 | 61.98 | 5.98 | 13.58 | 23.69 |
| | | LOFTR + MAGSAC | 20.70 | 25.75 | 49.53 | 54.87 | 20.82 | 31.61 | 39.99 |
| | | RPNet | 21.79 | 26.86 | 52.79 | 58.81 | 11.80 | 24.02 | 34.72 |
| | | SIFT + LO-RANSAC | 23.99 | 28.74 | 59.35 | 64.91 | 10.56 | 19.79 | 27.89 |
| | | SuperGlue + MAGSAC | 20.97 | 26.05 | 50.26 | 55.70 | 19.73 | 30.46 | 38.95 |
| | | ViTPose | 10.44 | 15.31 | 34.50 | 26.64 | 62.93 | 72.14 | 77.85 |
| | | Proposed | 3.19 | 5.96 | 10.42 | 10.05 | 91.98 | 95.29 | 97.15 |
| | [0, 100]m | DirectionNet [3] | 26.93 | 32.98 | 46.21 | 63.47 | 5.60 | 12.72 | 22.17 |
| | | LOFTR + MAGSAC | 24.31 | 31.06 | 53.48 | 56.78 | 19.49 | 29.83 | 37.94 |
| | | RPNet [6] | 25.43 | 32.20 | 56.49 | 60.47 | 10.97 | 22.37 | 32.45 |
| | | SIFT + LO-RANSAC | 27.79 | 34.16 | 62.81 | 66.37 | 9.86 | 18.53 | 26.23 |
| | | SuperGlue + MAGSAC | 24.61 | 31.41 | 54.23 | 57.57 | 18.49 | 28.71 | 36.87 |
| | | ViTPose | 13.03 | 19.62 | 38.49 | 28.91 | 60.07 | 69.58 | 75.58 |
| | | Proposed | 4.37 | 8.87 | 12.03 | 12.12 | 90.94 | 94.60 | 96.54 |
| | [0, 200]m | DirectionNet | 39.91 | 53.79 | 57.19 | 66.86 | 4.84 | 10.95 | 19.09 |
| | | LOFTR + MAGSAC | 37.33 | 51.43 | 64.13 | 60.84 | 16.92 | 26.12 | 33.50 |
| | | RPNet | 38.58 | 52.77 | 66.49 | 64.26 | 9.34 | 19.02 | 27.76 |
| | | SIFT + LO-RANSAC | 41.34 | 54.74 | 72.23 | 69.78 | 8.43 | 15.95 | 23.71 |
| | | SuperGlue + MAGSAC | 37.72 | 51.88 | 64.85 | 61.73 | 16.05 | 25.10 | 32.47 |
| | | ViTPose | 23.24 | 37.34 | 49.41 | 34.79 | 53.42 | 63.28 | 69.77 |
| | | Proposed | 8.26 | 16.83 | 16.21 | 17.65 | 88.34 | 93.16 | 95.50 |
| | [0, 300]m | DirectionNet | 47.28 | 66.22 | 63.68 | 67.91 | 4.64 | 10.49 | 18.28 |
| | | LOFTR + MAGSAC | 44.87 | 63.72 | 68.39 | 62.13 | 16.25 | 25.11 | 32.27 |
| | | RPNet | 45.90 | 65.19 | 70.68 | 65.44 | 8.92 | 18.16 | 26.52 |
| | | SIFT + LO-RANSAC | 48.70 | 66.93 | 76.05 | 70.86 | 8.07 | 15.28 | 21.78 |
| | | SuperGlue + MAGSAC | 44.99 | 64.18 | 69.12 | 62.97 | 15.42 | 24.15 | 31.27 |
| | | ViTPose | 39.34 | 48.72 | 53.83 | 36.92 | 51.41 | 61.23 | 67.78 |
| | | Proposed | 10.67 | 22.38 | 17.81 | 19.78 | 87.30 | 92.62 | 95.16 |
| HITNet | [0, 80]m | DirectionNet [3] | 21.86 | 26.83 | 48.91 | 63.74 | 6.80 | 15.24 | 26.00 |
| | | LOFTR + MAGSAC | 18.31 | 23.70 | 50.62 | 50.27 | 25.80 | 39.03 | 48.61 |
| | | RPNet | 19.78 | 25.36 | 58.32 | 55.66 | 15.69 | 30.73 | 42.99 |
| | | SIFT + LO-RANSAC | 22.79 | 27.75 | 66.73 | 64.86 | 12.38 | 23.85 | 34.53 |
| | | SuperGlue + MAGSAC | 18.53 | 23.96 | 51.55 | 50.84 | 24.60 | 37.86 | 47.68 |
| | | ViTPose | 7.54 | 11.82 | 27.96 | 19.87 | 71.98 | 82.70 | 87.76 |
| | | Proposed | 1.71 | 3.94 | 7.82 | 5.81 | 96.27 | 98.01 | 98.86 |
| | [0, 100]m | DirectionNet | 25.19 | 32.01 | 53.50 | 65.61 | 6.47 | 14.48 | 24.73 |
| | | LOFTR + MAGSAC | 21.50 | 28.77 | 55.55 | 52.36 | 24.48 | 37.28 | 46.65 |
| | | RPNet | 23.10 | 30.58 | 63.64 | 57.80 | 14.80 | 29.06 | 40.84 |
| | | SIFT + LO-RANSAC | 26.31 | 33.03 | 71.40 | 66.88 | 11.72 | 22.60 | 32.86 |
| | | SuperGlue + MAGSAC | 21.74 | 29.06 | 56.50 | 52.91 | 23.35 | 36.15 | 45.79 |
| | | ViTPose | 9.50 | 15.43 | 31.70 | 21.65 | 69.36 | 80.25 | 86.10 |
| | | Proposed | 2.38 | 5.54 | 9.04 | 6.89 | 95.61 | 97.58 | 98.52 |
| | [0, 200]m | DirectionNet | 37.95 | 54.05 | 66.91 | 69.98 | 5.73 | 12.87 | 21.96 |
| | | LOFTR + MAGSAC | 33.94 | 50.62 | 69.59 | 57.82 | 21.66 | 33.32 | 42.06 |
| | | RPNet | 35.75 | 52.68 | 77.87 | 63.18 | 12.95 | 25.52 | 36.05 |
| | | SIFT + LO-RANSAC | 39.51 | 55.18 | 84.43 | 71.55 | 10.33 | 20.02 | 29.26 |
| | | SuperGlue + MAGSAC | 34.20 | 50.93 | 70.52 | 58.20 | 20.69 | 32.38 | 41.16 |
| | | ViTPose | 18.05 | 32.62 | 43.18 | 27.80 | 63.42 | 75.36 | 81.44 |
| | | Proposed | 6.02 | 14.56 | 13.32 | 10.66 | 93.54 | 96.14 | 97.41 |
| | [0, 300]m | DirectionNet | 47.23 | 71.78 | 73.97 | 71.85 | 5.46 | 12.31 | 20.84 |
| | | LOFTR + MAGSAC | 43.19 | 68.59 | 76.88 | 60.62 | 20.60 | 31.73 | 40.15 |
| | | RPNet | 44.88 | 70.37 | 84.58 | 65.39 | 12.26 | 24.18 | 34.23 |
| | | SIFT + LO-RANSAC | 49.22 | 73.17 | 91.17 | 73.76 | 9.79 | 19.03 | 27.86 |
| | | SuperGlue + MAGSAC | 43.48 | 68.87 | 77.74 | 60.85 | 19.68 | 30.74 | 39.27 |
| | | ViTPose | 35.39 | 48.54 | 49.56 | 30.19 | 60.34 | 72.69 | 79.06 |
| | | Proposed | 9.53 | 24.84 | 15.99 | 14.20 | 92.53 | 95.47 | 96.83 |

FIG. 28

| Stereo Model | Depth Range | Method | lower is better | | | | higher is better | | |
|---|---|---|---|---|---|---|---|---|---|
| | | | MAE | RMSE | SILog | absrel | $d<1.25$ | $d<1.25^2$ | $d<1.25^3$ |
| DLNR | [0, 80]m | DirectionNet | 5.12 | 9.33 | 22.80 | 18.63 | 75.48 | 88.10 | 92.73 |
| | | LOFTR + MAGSAC | 3.34 | 6.10 | 17.50 | 12.13 | 87.02 | 92.19 | 94.11 |
| | | RPNet | 5.86 | 10.08 | 27.73 | 21.85 | 70.67 | 89.10 | 94.18 |
| | | SIFT + LO-RANSAC | 15.78 | 20.84 | 64.55 | 74.01 | 4.86 | 9.56 | 14.11 |
| | | SuperGlue + MAGSAC | 5.41 | 9.82 | 28.76 | 21.03 | 72.24 | 79.03 | 82.48 |
| | | ViTPose | 2.10 | 4.22 | 10.01 | 7.55 | 95.21 | 98.39 | 99.30 |
| | | Proposed | 0.97 | 2.39 | 8.94 | 3.50 | 96.88 | 98.91 | 99.53 |
| | [0, 100]m | DirectionNet | 5.89 | 10.88 | 29.23 | 19.45 | 74.31 | 87.10 | 91.65 |
| | | LOFTR + MAGSAC | 3.81 | 7.23 | 18.30 | 12.53 | 86.03 | 91.87 | 93.89 |
| | | RPNet | 6.74 | 12.04 | 29.41 | 22.87 | 69.26 | 87.67 | 93.51 |
| | | SIFT + LO-RANSAC | 16.93 | 23.02 | 66.15 | 74.39 | 4.77 | 9.39 | 13.86 |
| | | SuperGlue + MAGSAC | 6.05 | 10.45 | 29.87 | 21.48 | 71.46 | 78.52 | 82.05 |
| | | ViTPose | 2.43 | 5.10 | 10.60 | 7.89 | 94.43 | 98.20 | 99.30 |
| | | Proposed | 1.15 | 3.10 | 9.31 | 3.66 | 96.63 | 98.79 | 99.47 |
| | [0, 200]m | DirectionNet | 8.14 | 17.35 | 32.23 | 21.51 | 72.72 | 85.19 | 90.19 |
| | | LOFTR + MAGSAC | 4.94 | 10.52 | 20.04 | 13.20 | 84.66 | 91.10 | 93.48 |
| | | RPNet | 9.51 | 20.01 | 33.13 | 25.53 | 67.72 | 85.27 | 91.20 |
| | | SIFT + LO-RANSAC | 19.23 | 28.45 | 69.11 | 74.99 | 4.65 | 9.17 | 13.55 |
| | | SuperGlue + MAGSAC | 7.47 | 14.27 | 31.98 | 23.15 | 70.41 | 77.70 | 81.43 |
| | | ViTPose | 3.33 | 8.00 | 11.98 | 8.55 | 92.94 | 97.68 | 98.93 |
| | | Proposed | 1.68 | 4.70 | 9.98 | 3.96 | 96.22 | 98.57 | 99.34 |
| | [0, 300]m | DirectionNet | 9.44 | 23.00 | 33.40 | 22.47 | 72.42 | 84.78 | 89.66 |
| | | LOFTR + MAGSAC | 5.47 | 12.42 | 20.64 | 13.40 | 84.39 | 90.84 | 93.30 |
| | | RPNet | 11.11 | 25.93 | 34.77 | 26.27 | 67.44 | 84.85 | 90.60 |
| | | SIFT + LO-RANSAC | 20.13 | 31.06 | 70.03 | 75.17 | 4.63 | 9.12 | 13.49 |
| | | SuperGlue + MAGSAC | 8.11 | 16.36 | 32.71 | 23.32 | 70.21 | 77.49 | 81.24 |
| | | ViTPose | 3.79 | 9.78 | 12.50 | 8.80 | 92.63 | 97.42 | 98.80 |
| | | Proposed | 1.82 | 5.66 | 10.17 | 4.85 | 96.09 | 98.51 | 99.30 |
| HITNet | [0, 80]m | DirectionNet | 4.58 | 8.21 | 17.65 | 16.84 | 78.86 | 93.92 | 97.69 |
| | | LOFTR + MAGSAC | 2.61 | 5.02 | 13.72 | 9.72 | 91.99 | 95.77 | 97.14 |
| | | RPNet | 5.94 | 9.95 | 16.05 | 22.42 | 69.20 | 92.84 | 99.12 |
| | | SIFT + LO-RANSAC | 15.84 | 21.24 | 80.82 | 78.53 | 6.50 | 12.74 | 18.48 |
| | | SuperGlue + MAGSAC | 4.16 | 7.54 | 23.79 | 16.19 | 78.18 | 86.37 | 89.91 |
| | | ViTPose | 1.78 | 3.59 | 8.40 | 6.45 | 97.70 | 99.19 | 99.63 |
| | | Proposed | 0.66 | 2.21 | 7.47 | 2.78 | 98.63 | 99.41 | 99.78 |
| | [0, 100]m | DirectionNet | 5.60 | 10.67 | 19.55 | 18.25 | 77.17 | 92.25 | 96.97 |
| | | LOFTR + MAGSAC | 3.07 | 6.28 | 14.78 | 10.14 | 89.90 | 95.44 | 96.96 |
| | | RPNet | 7.35 | 13.15 | 18.59 | 24.47 | 67.37 | 89.99 | 98.00 |
| | | SIFT + LO-RANSAC | 17.12 | 23.79 | 83.16 | 79.59 | 6.38 | 12.49 | 18.15 |
| | | SuperGlue + MAGSAC | 4.78 | 9.11 | 25.22 | 16.69 | 77.34 | 85.75 | 89.49 |
| | | ViTPose | 2.12 | 4.60 | 9.05 | 6.80 | 96.67 | 99.07 | 99.56 |
| | | Proposed | 0.81 | 2.82 | 7.92 | 2.87 | 98.46 | 99.34 | 99.67 |
| | [0, 200]m | DirectionNet | 10.56 | 24.85 | 26.92 | 23.79 | 74.23 | 88.33 | 93.30 |
| | | LOFTR + MAGSAC | 4.83 | 12.98 | 18.04 | 11.25 | 87.70 | 93.97 | 96.18 |
| | | RPNet | 14.09 | 31.19 | 28.09 | 32.54 | 64.51 | 85.18 | 91.79 |
| | | SIFT + LO-RANSAC | 21.05 | 33.29 | 88.71 | 83.34 | 6.15 | 12.06 | 17.54 |
| | | SuperGlue + MAGSAC | 6.96 | 15.72 | 29.39 | 17.94 | 75.49 | 84.18 | 88.24 |
| | | ViTPose | 3.50 | 9.62 | 11.57 | 7.82 | 94.18 | 98.24 | 99.19 |
| | | Proposed | 1.54 | 6.22 | 9.60 | 3.49 | 97.83 | 99.01 | 99.47 |
| | [0, 300]m | DirectionNet | 15.19 | 39.74 | 31.83 | 28.03 | 73.42 | 87.25 | 91.84 |
| | | LOFTR + MAGSAC | 6.46 | 18.01 | 20.37 | 11.86 | 86.98 | 93.23 | 95.54 |
| | | RPNet | 20.48 | 50.30 | 34.56 | 38.90 | 63.78 | 84.04 | 90.12 |
| | | SIFT + LO-RANSAC | 23.96 | 41.75 | 91.36 | 86.18 | 6.08 | 11.92 | 17.33 |
| | | SuperGlue + MAGSAC | 8.87 | 22.19 | 31.88 | 18.61 | 74.90 | 83.52 | 87.99 |
| | | ViTPose | 4.76 | 14.77 | 13.43 | 8.42 | 93.36 | 97.49 | 98.75 |
| | | Proposed | 2.37 | 9.90 | 10.81 | 3.93 | 97.32 | 98.75 | 99.30 |

FIG. 29

| Stereo Model | Depth Range | Method | lower is better | | | | higher is better | | |
|---|---|---|---|---|---|---|---|---|---|
| | | | MAE | RMSE | SILog | absrel | $d<1.25$ | $d<1.25^2$ | $d<1.25^3$ |
| IRNN | (0, 80)m | DirectionNet | 18.39 | 26.41 | 61.00 | 52.29 | 15.35 | 26.98 | 36.82 |
| | | LOFTR + MAGSAC | 8.98 | 13.85 | 35.24 | 26.41 | 62.29 | 69.60 | 74.44 |
| | | RPNet | 16.08 | 22.44 | 61.23 | 49.54 | 24.03 | 39.87 | 50.23 |
| | | SIFT + LO-RANSAC | 20.97 | 28.74 | 60.47 | 67.25 | 9.10 | 16.80 | 23.81 |
| | | SuperGlue + MAGSAC | 10.37 | 15.65 | 41.09 | 30.81 | 55.93 | 64.58 | 70.18 |
| | | ViTPose | 5.91 | 10.43 | 27.90 | 16.20 | 77.74 | 86.42 | 90.08 |
| | | Proposed | 4.86 | 6.95 | 12.78 | 11.40 | 86.48 | 96.55 | 98.75 |
| | (0, 100)m | DirectionNet | 22.82 | 31.75 | 66.42 | 59.88 | 14.00 | 23.99 | 33.90 |
| | | LOFTR + MAGSAC | 11.89 | 18.85 | 39.83 | 28.30 | 60.28 | 67.47 | 72.36 |
| | | RPNet | 20.52 | 29.58 | 67.22 | 51.96 | 22.25 | 37.06 | 47.32 |
| | | SIFT + LO-RANSAC | 25.86 | 34.25 | 65.31 | 68.96 | 8.41 | 15.21 | 22.03 |
| | | SuperGlue + MAGSAC | 13.61 | 21.12 | 45.78 | 32.89 | 53.50 | 62.28 | 67.67 |
| | | ViTPose | 8.25 | 14.82 | 32.68 | 18.08 | 74.44 | 83.98 | 88.10 |
| | | Proposed | 5.63 | 9.84 | 18.09 | 12.75 | 83.13 | 95.81 | 98.18 |
| | (0, 200)m | DirectionNet | 44.50 | 64.18 | 83.52 | 66.13 | 10.98 | 19.78 | 26.93 |
| | | LOFTR + MAGSAC | 26.66 | 42.65 | 54.69 | 34.71 | 53.28 | 60.78 | 65.34 |
| | | RPNet | 41.61 | 61.49 | 85.68 | 59.15 | 17.71 | 29.89 | 38.22 |
| | | SIFT + LO-RANSAC | 48.48 | 67.35 | 80.78 | 73.93 | 6.68 | 12.34 | 17.58 |
| | | SuperGlue + MAGSAC | 30.39 | 47.67 | 61.71 | 39.86 | 45.73 | 54.81 | 60.10 |
| | | ViTPose | 20.53 | 33.93 | 47.38 | 24.51 | 63.72 | 75.87 | 81.47 |
| | | Proposed | 15.42 | 26.55 | 23.25 | 18.55 | 71.27 | 87.85 | 94.85 |
| | (0, 300)m | DirectionNet | 51.54 | 76.85 | 87.36 | 67.24 | 10.54 | 18.89 | 25.85 |
| | | LOFTR + MAGSAC | 32.33 | 53.78 | 58.69 | 36.17 | 51.76 | 59.27 | 63.90 |
| | | RPNet | 48.67 | 74.37 | 89.76 | 60.53 | 17.02 | 28.93 | 36.75 |
| | | SIFT + LO-RANSAC | 55.86 | 80.43 | 84.82 | 74.97 | 6.37 | 11.74 | 16.79 |
| | | SuperGlue + MAGSAC | 36.38 | 59.21 | 65.75 | 41.34 | 44.24 | 53.21 | 58.58 |
| | | ViTPose | 25.58 | 46.14 | 50.58 | 26.14 | 61.57 | 73.71 | 79.29 |
| | | Proposed | 21.17 | 38.11 | 26.93 | 21.21 | 68.52 | 83.67 | 91.48 |
| HITNet | (0, 80)m | DirectionNet | 17.12 | 24.14 | 76.69 | 59.66 | 24.13 | 43.34 | 57.70 |
| | | LOFTR + MAGSAC | 8.22 | 13.30 | 37.37 | 26.28 | 66.75 | 77.07 | 83.51 |
| | | RPNet | 15.79 | 22.68 | 68.43 | 54.86 | 31.28 | 52.84 | 66.95 |
| | | SIFT + LO-RANSAC | 20.36 | 28.56 | 73.35 | 66.74 | 13.15 | 24.39 | 34.35 |
| | | SuperGlue + MAGSAC | 9.33 | 14.84 | 42.44 | 30.89 | 62.13 | 75.11 | 83.14 |
| | | ViTPose | 5.96 | 10.66 | 26.60 | 18.11 | 78.09 | 88.05 | 92.57 |
| | | Proposed | 4.28 | 6.98 | 13.77 | 12.11 | 85.68 | 98.34 | 98.72 |
| | (0, 100)m | DirectionNet | 21.80 | 31.38 | 86.46 | 63.39 | 22.50 | 40.37 | 53.82 |
| | | LOFTR + MAGSAC | 11.04 | 18.19 | 43.54 | 28.56 | 64.62 | 74.58 | 80.78 |
| | | RPNet | 20.12 | 29.73 | 78.33 | 58.51 | 29.22 | 49.48 | 62.71 |
| | | SIFT + LO-RANSAC | 25.25 | 34.12 | 81.95 | 69.97 | 12.18 | 23.72 | 31.86 |
| | | SuperGlue + MAGSAC | 12.82 | 20.33 | 49.67 | 33.13 | 59.39 | 72.12 | 79.85 |
| | | ViTPose | 8.22 | 14.96 | 33.76 | 20.86 | 74.98 | 85.81 | 90.44 |
| | | Proposed | 5.73 | 9.79 | 15.67 | 13.47 | 82.46 | 94.87 | 98.12 |
| | (0, 200)m | DirectionNet | 42.64 | 63.28 | 111.36 | 73.26 | 18.00 | 32.28 | 43.80 |
| | | LOFTR + MAGSAC | 24.48 | 40.41 | 60.06 | 35.28 | 57.86 | 67.74 | 73.38 |
| | | RPNet | 40.40 | 60.98 | 102.74 | 66.72 | 23.49 | 40.12 | 51.44 |
| | | SIFT + LO-RANSAC | 46.91 | 66.43 | 104.37 | 75.28 | 9.81 | 18.35 | 25.80 |
| | | SuperGlue + MAGSAC | 28.18 | 45.71 | 69.46 | 40.63 | 51.04 | 63.54 | 70.79 |
| | | ViTPose | 19.33 | 34.46 | 45.81 | 26.06 | 65.41 | 78.31 | 84.44 |
| | | Proposed | 15.55 | 26.78 | 21.58 | 19.66 | 78.73 | 87.82 | 94.38 |
| | (0, 300)m | DirectionNet | 51.89 | 80.65 | 119.13 | 75.33 | 17.20 | 31.03 | 41.69 |
| | | LOFTR + MAGSAC | 31.18 | 55.98 | 65.94 | 37.93 | 55.89 | 66.74 | 71.48 |
| | | RPNet | 49.73 | 78.98 | 110.64 | 74.88 | 22.44 | 38.27 | 49.03 |
| | | SIFT + LO-RANSAC | 55.52 | 82.09 | 111.41 | 77.38 | 9.33 | 17.48 | 24.63 |
| | | SuperGlue + MAGSAC | 35.54 | 60.29 | 75.77 | 43.50 | 48.98 | 61.15 | 68.81 |
| | | ViTPose | 25.32 | 46.70 | 50.48 | 28.48 | 62.90 | 75.90 | 82.46 |
| | | Proposed | 22.65 | 40.81 | 25.78 | 23.34 | 67.52 | 83.94 | 91.17 |

FIG. 30

FLOW-GUIDED ONLINE STEREO RECTIFICATION

CROSS-REFERENCE TO RELATED APPLICATIONS

This application claims priority to and the benefit of U.S. Provisional Patent Application Ser. No. 63/667,026, entitled "FLOW GUIDED ONLINE STEREO RECTIFICATION," filed Jul. 2, 2024, the content of which is incorporated herein in its entirety for all purposes.

TECHNICAL FIELD

The field of the disclosure relates generally to image processing and, more specifically, rectifying stereo images.

BACKGROUND OF THE INVENTION

Many systems, including autonomous vehicles, make use of stereo camera systems. During use, it is possible for stereo camera systems to become misaligned due to vibrations or environmental factors, leading to deviations from the base calibration. This issue is exacerbated with wide baseline camera system, such as those used on wider vehicles like autonomous trucks. The mounting structures for large baseline camera systems may stretch, twist, or otherwise deform due to temperature and stress gradients. Misalignment of stereo camera systems can result in poor performance of down-stream tasks, such as depth estimation, object detection, and semantic segmentation, among others.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

One general aspect includes an autonomous vehicle, the autonomous vehicle includes a stereo camera pair disposed on the autonomous vehicle, the stereo camera pair may include a first camera and a second camera separated by a baseline distance, the first camera and the second camera configured to capture a first image and a second image, respectively; at least one memory device storing computer executable instructions. The vehicle also includes at least one processor coupled to the at least one memory device and the stereo camera pair, the least one processor, upon execution of the computer executable instructions, configured to: receive the first image and the second image captured using respective cameras in the stereo camera pair; predict, using a neural network model, a rotation matrix between the first image and the second image by: extracting a first feature map and a second feature map based on the first image and the second image; applying positional feature enhancement on the first feature map and the second feature map to derive a first enhanced feature map and a second enhanced feature map; computing a correlation volume across the first enhanced feature map and the second feature map; determining a set of likely matches between the first enhanced feature map and the second feature map based on the correlation volume; computing a predicted relative pose based on the set of likely matches; and computing the rotation matrix based on the predicted relative pose. The vehicle also includes calibrate the stereo camera pair by: employing differentiable rectification to rectify the first image and the second image based on the rotation matrix. Other embodiments of this aspect include corresponding computer systems, apparatus, and computer programs recorded on one or more computer storage devices, each configured to perform the actions of the methods.

One general aspect includes a computer-implemented method of calibrating a stereo camera pair. The computer-implemented method of calibrating includes capturing a first image and a second image using respective cameras in a stereo camera pair. The calibrating also includes predicting, using a neural network model, a rotation matrix between the first image and the second image by: extracting a first feature map and a second feature map based on the first image and the second image, applying positional feature enhancement on the first feature map and the second feature map to derive a first enhanced feature map and a second enhanced feature map, computing a correlation volume across the first enhanced feature map and the second feature map, determining a set of likely matches between the first enhanced feature map and the second feature map based on the correlation volume, computing a predicted relative pose based on the set of likely matches, and computing the rotation matrix based on the predicted relative pose. The calibrating also includes calibrating the stereo camera pair by: employing differentiable rectification to rectify the first image and the second image based on the rotation matrix.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 11 is a table showing quantitative evaluation on various datasets;

FIG. 12 is a table showing inference times;

FIG. 15 is a table showing an example architecture of the feature extractor and feature enhancement blocks;

FIG. 16 is a table showing additional ablation experiments on CARLA;

FIG. 18 is a table showing quantitative evaluation of various data sets according to the rotation errors along all three axes of rotation;

FIG. 19 is a table showing quantitative evaluation of various times of day for the data sets.

FIG. 28 is a chart showing stereo depth evaluation on the semi-truck highway dataset using DLNR-Middlebury and HITNet stereo models;

FIG. 29 is a chart showing stereo depth evaluation on the KITTI dataset using DLNR-Middlebury and HITNet stereo models; and FIG. 30 is a chart showing stereo depth evaluation on the CARLA dataset using DLNR-Middlebury and HITNet stereo models.

Figure 1:
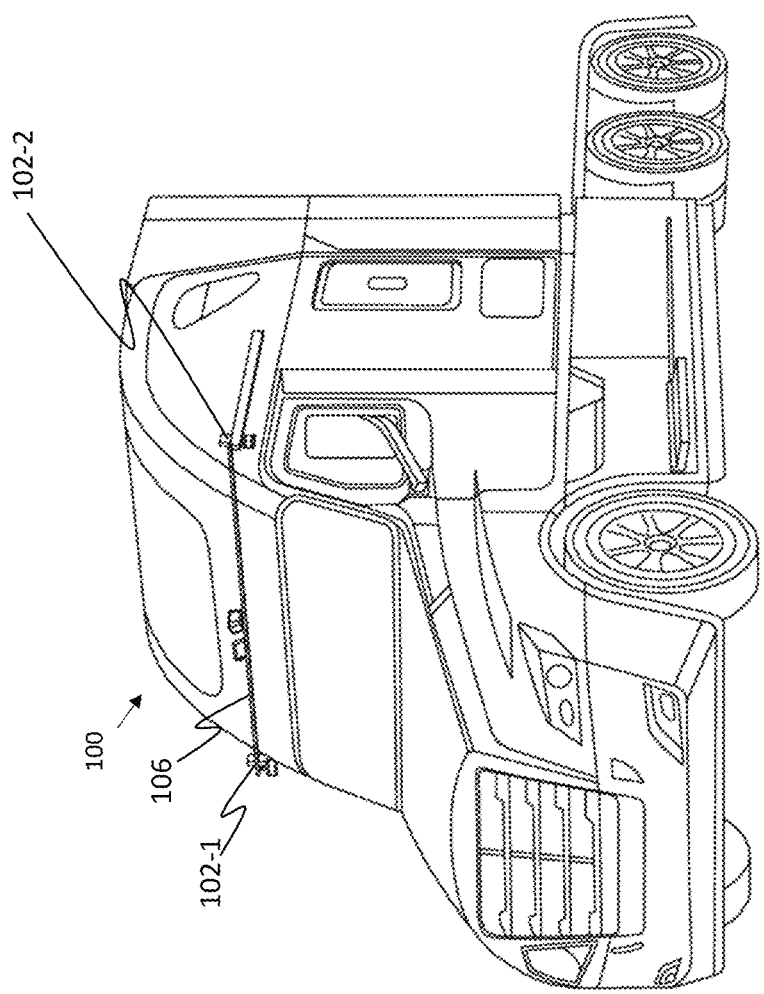
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Many systems, including autonomous vehicles, may make use of stereo camera systems. During use, it is possible for stereo camera systems to become misaligned due to road vibrations, leading to deviations from offline calibration. This issue is exacerbated with wide baseline camera system, such as those used on wider vehicles like autonomous trucks. The mounting structures for large baselines can stretch and twist due to temperature and stress gradients. Misalignment of stereo camera systems can result in poor performance of down-stream tasks, such as depth estimation, object detection, and semantic segmentation, among others.

Since images exist in 2D space, stereo coplanarity enables efficient stereo matching and stereo depth estimation by nullifying the disparity in one of the axes, thereby reducing the matching search space to 1D. While perfect stereo coplanarity is difficult to achieve and maintain, stereo rectification aims to project a pair of images onto a common image plane such that there is no vertical disparity between corresponding pixels across the images.

Existing system and solutions for calibration and rectification methods are not computationally permissible to deploy in an "online" setting. As used herein, "online" refers to calibration and/or rectification being deployed while a machine equipped with at least one stereo camera pair is operating. An example machine may be an autonomous vehicle or a robot. Existing calibration system must use visual patterns with known geometry to determine intrinsic and extrinsic of the setup. There exists a need for a solution to the misalignment issue found with stereo cameras during use of autonomous vehicles that is both accurate and computationally permissive. An autonomous vehicle is described herein as an example for illustration purposes only. Systems and methods described herein may be applied to other machines equipped with at least one stereo camera pair, such as robots.

To that end, the present application is directed to systems and methods for an online rectification process that periodically re-rectify autonomous vehicle sensors to address unsatisfactory calibration quality. The system and method include an online stereo pose estimation model that utilizes a correlation volume to determine relative pose between two cameras. A transformer encoder produces feature representations built from global context and cross-view context. A machine learning model is trained with weak supervision and a proxy rectification constraint that is computed in a self-supervised fashion. Vertical optical flow is used to interpret the degree of vertical disparity and train the model to minimize it.

Figure 2:
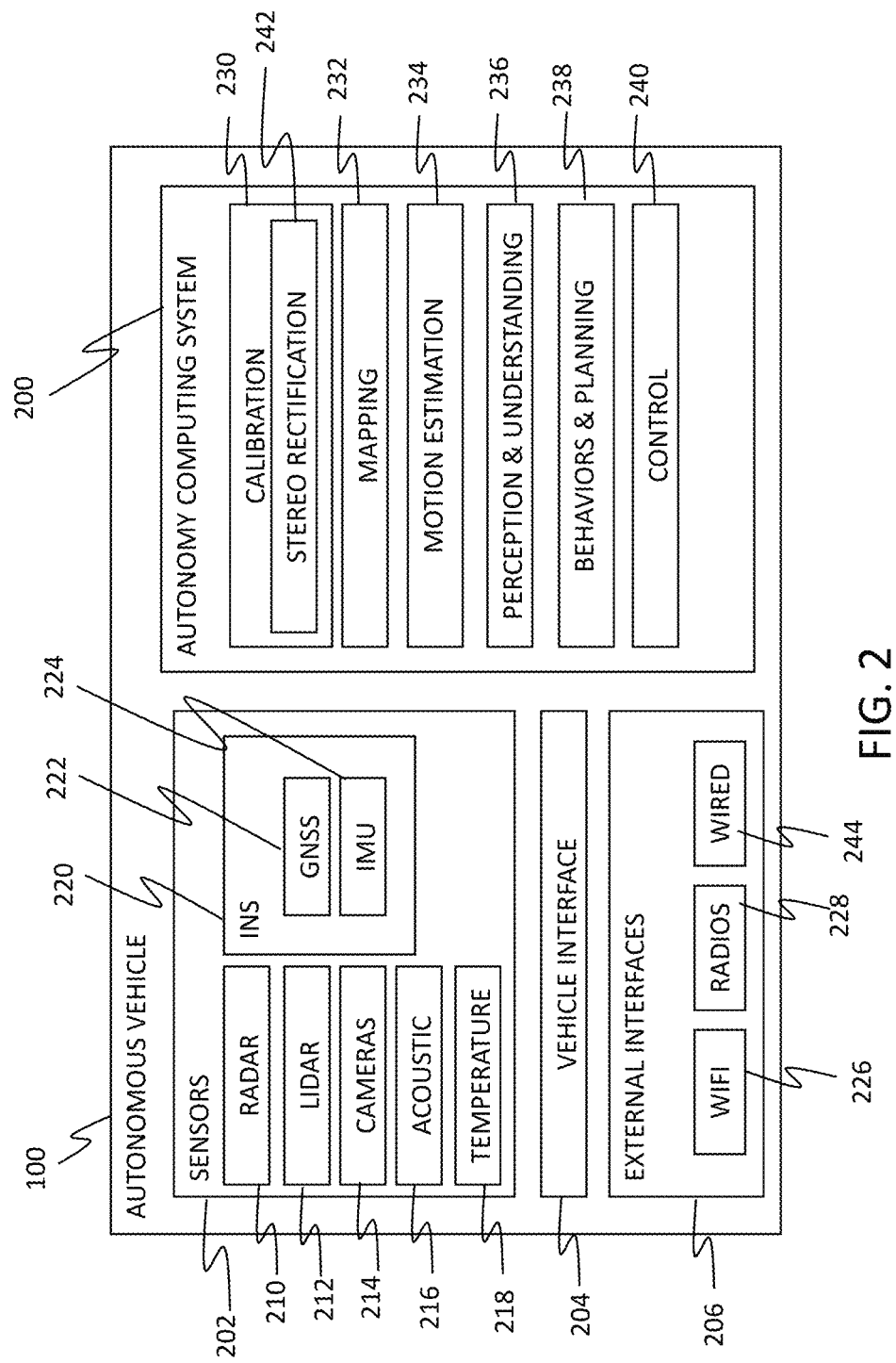
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes a stereo camera pair, for example, a first camera 102-1 and a second camera 102-2. The first camera and the second camera are configured to capture a first image and a second image, respectively. The first camera 102-1 and the second camera 102-2 are separated by a baseline 106. In some embodiments, the baseline 106 may be a wide baseline, separating the cameras by more than 60 cm either horizontally or vertically. Autonomous vehicle 100 also includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operation of autonomous vehicle 100.

Cameras 214 are configured to capture images of the environment surrounding autonomous vehicle 100 in any aspect or field of view (FOV). The FOV may have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 may be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and stereo rectification module 242. Stereo rectification module 242, for example, may be embodied within another module, such as calibration module 230, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Behaviors and planning module 238 maintains proper lane position for autonomous vehicle 100 in all conditions, e.g., regardless of signage for given road conditions. Behaviors and planning module 238 receives, for example, positions of left or right lane markings from perception and understanding module 236 and computes a lane position offset from the identified lane marking. Where both left and right lane markings are detected by perceptions and understanding module 236, in combination with sensors 202, behaviors and planning module 238 selects one lane marking from which lane positioning is derived.

Stereo rectification module 242 rectifies one or more input images and calibrates the stereo cameras 102 based on the rectification. For example, the module receives a pair of images, extracts a pair feature maps from the pair of images, enhances the pair of feature maps with positional data, computes a correlation volume to determine likely matches between the images, then rectifies the images, calibrates the cameras based on the rectification, and trains a neural network model.

Autonomy computing system 200 of autonomous vehicle 100 may be completely autonomous (fully autonomous) or semi-autonomous. In one example, autonomy computing system 200 may operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3A:
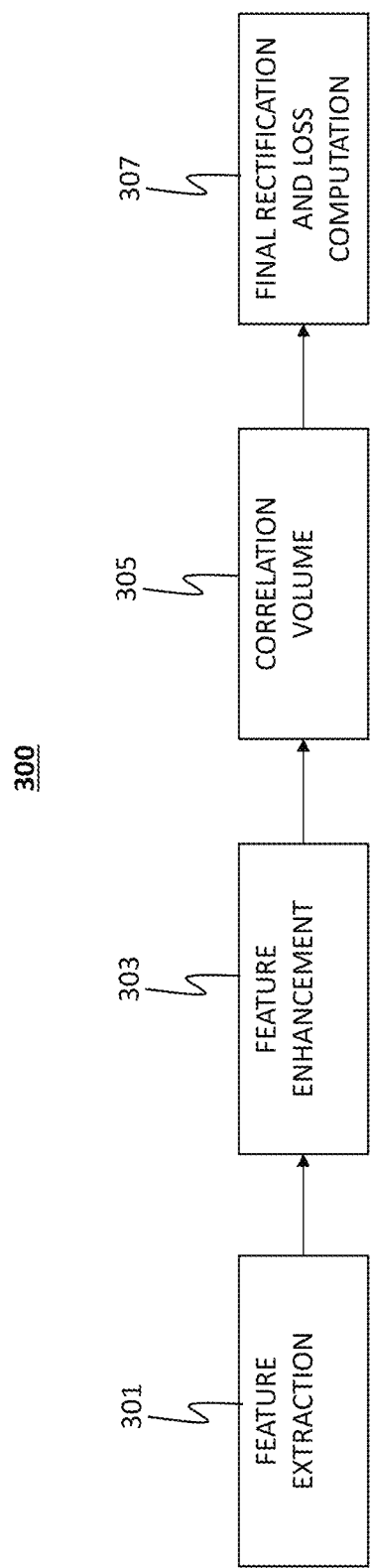
FIG. 3A is a flowchart showing an overview of the camera calibration process by a stereo rectification module.

Referring now to FIG. 3A, FIG. 3A shows an overview flowchart of data processing 300 by the stereo rectification module 242. Stereo rectification module 242 may be implemented either as part of an autonomous vehicle 100 or as part of autonomy computing system 200. As shown in FIG. 1, autonomous vehicle 100 includes a stereo camera pair separated by a baseline distance. Stereo camera pair includes first camera 102-1 and a second camera 102-2 configured to capture first image 302 and second image 304, respectively. Autonomous vehicle 100 includes a memory storing computer executable instructions, and a processor coupled to the memory and to the stereo camera pair. The processor, upon execution of the computer executable instructions, is configured to execute the instructions.

In the example embodiment, first, in feature extraction 301, stereo rectification module 242 extracts features from at least two input images from stereo camera pair 102, 104. Feature extraction 301 may be performed via a machine learning component, for example, a convolutional neural network. Feature extraction 301 outputs a feature map for the at least two input images, resulting in at least two feature maps.

The at least two feature maps then undergo feature enhancement 303. Feature enhancement 303 may include any processing or computations on the feature maps before further computations are performed using the feature maps. For example, feature maps may undergo positional encoding to enhance spatial information to the feature maps.

The enhanced feature maps are then used in computation of a correlation volume 305. The correlation volume may be computed by, for example, flattening the feature maps, applying a softmax to the flattened feature maps, and then processing the flattened feature maps in a decoder layer of the stereo rectification module 242 to produce a set of likely matches between the feature maps.

Once a set of likely matches is determined, stereo rectification module 242 proceeds to computes the final rectification and losses 307, computing the losses using one or more loss functions. Stereo rectification module 242 then computes a predicted relative pose based on the set of likely matches and computes a rotation matrix based on the predicted relative pose. The rotation matrix is then used to calibrate the stereo camera pair by employing differentiable rectification to rectify the first image and the second image based on the rotation matrix.

Figure 3B:
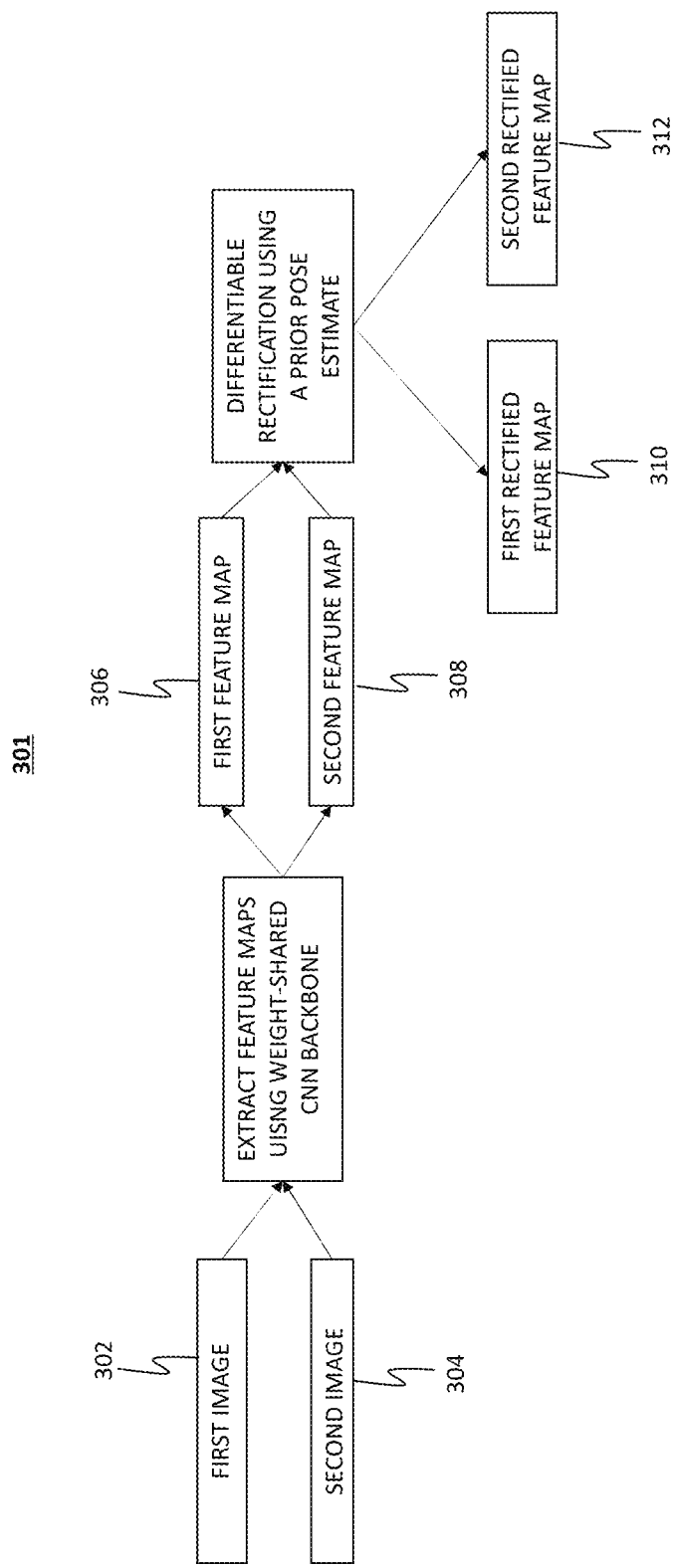
FIG. 3B is a flowchart showing the processes of feature extraction.
Figure 3C:
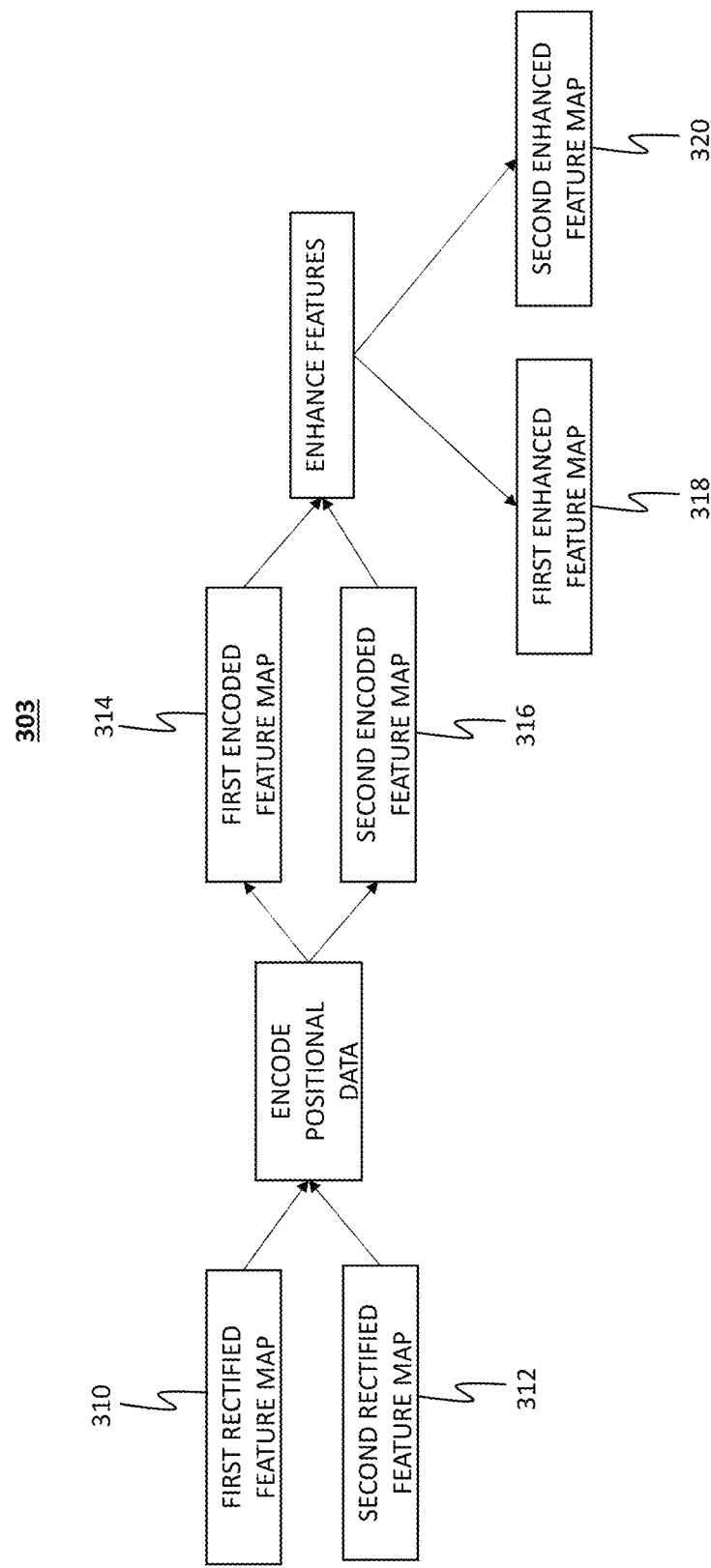
FIG. 3C is a flowchart showing the process of feature enhancement.
Figure 3D:
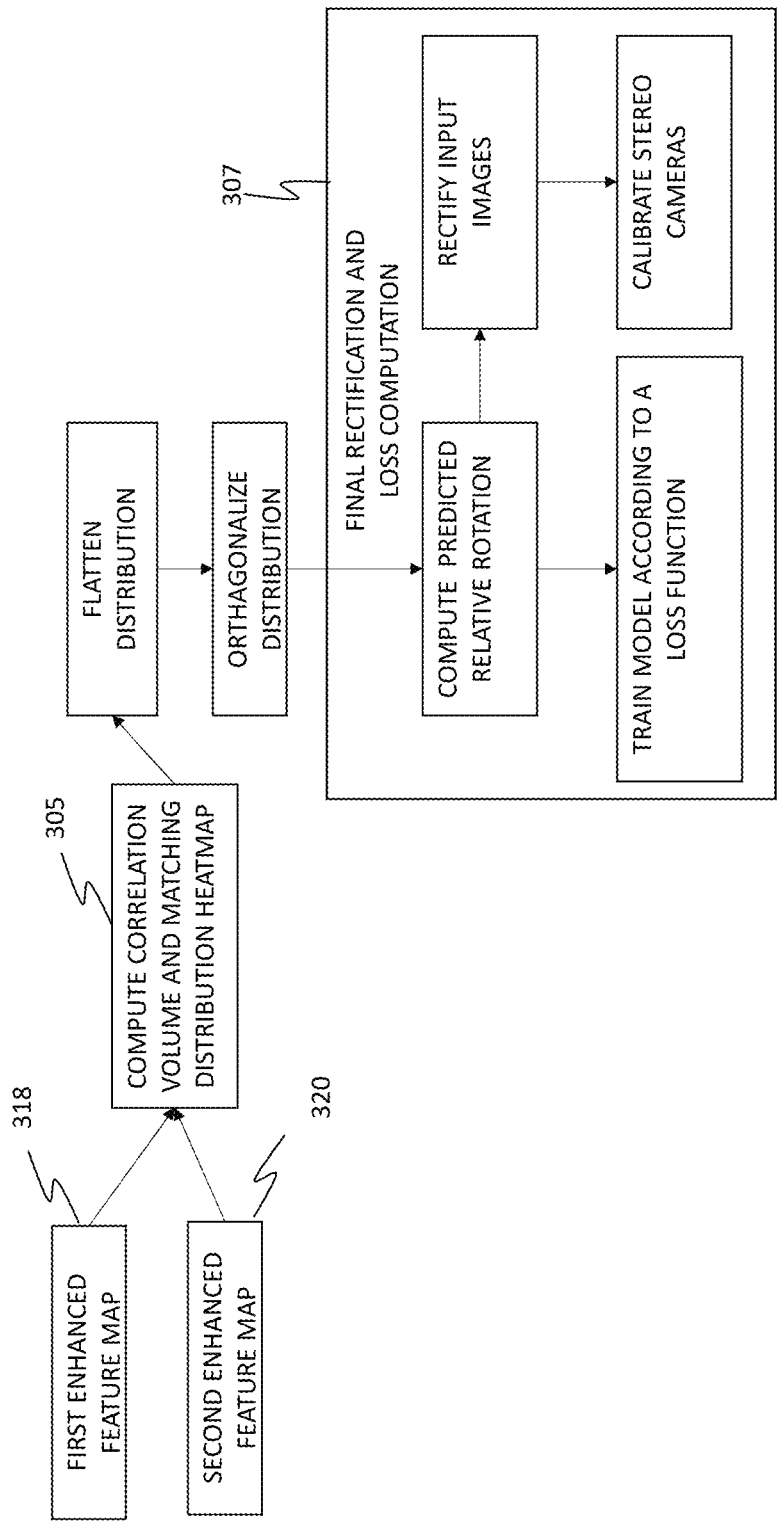
FIG. 3D is a flowchart showing the computation of correlation volume, final rectification and losses, and calibration of cameras.

FIGS. 3B-3D show flowcharts of example processes in data processing 300 by the stereo rectification module 242 as shown in FIG. 3A. FIG. 3B shows a flowchart of an example feature extraction 301. FIG. 3C. shows a flowchart of an example feature enhancement 303. FIG. 3D shows a flowchart of the computation of the correlation volume 305 and final rectification.

In the example embodiment, in feature extraction 301, stereo rectification module 242 receives the first image 302 and the second image 304 from the first camera 102-1 and the second camera 102-2, respectively. In practice, the first image 302 and the second image 304 are misaligned due to the movement and de-calibration that occur during operation of autonomous vehicle. Thus, stereo rectification module 242 is configured to determine and match features between the input images before rectifying the images, described below.

Stereo rectification module 242 processes, using a neural network component, the first image 302 and the second image 304 to extract a first feature map 306 and a second feature map 308. In one embodiment, the neural network component is a convolutional neural network (CNN), further including a weight-shared CNN backbone. The CNN backbone includes one or more residual convolution blocks. For example, the CNN backbone includes three residual convolution blocks.

The neural network model processes the first image 302 and the second image 304 to extract features from each image, resulting in a first feature map 306 from the first image 302, and a second feature map 308 for the second image 304. In some embodiments, the features are limited in capturing globally discriminative features, as the convolution operations are local in nature. Lower dimensional feature representations lend to computational and memory advantage for downstream tasks—this provides global feature extraction while offering real-time runtime when the autonomous vehicle is in operation.

Before further processing of the feature maps, stereo rectification module 242 rectifies the first feature map 306 and the second feature map 308, for example, by employing a differentiable rectification function. In some embodiments, stereo rectification module 242 employs a prior pose estimate to perform the differentiable rectification function. The prior pose estimate is an estimation of the relative pose between the cameras drawn from a previous pose estimation, or set to the identity pose if a prior estimate has not been performed. This produces a first rectified feature map 310 and a second rectified feature map 312. The differentiable rectification function is defined as follows: assume two images $I_1, I_2 \in \mathbb{R}^{H \times W \times 3}$, where H×W is the height and width dimensions of the first image 302 and the second image 304, the relative pose between the sensors (in this case, the first and second camera 102) as $P=[R|t] \in SE(3)$, and intrinsics $K_1, K_2 \in \mathbb{R}^{3 \times 3}$. Then, project $I_1$, $I_2$ onto a common image plane using rectification rotations $R_1$, $R_2$ derived from the relative pose P, resulting in two rectified images: $I_{1rect}$, $I_{2rect}$.

The differentiable rectification function may be broken down into two processes: estimating the rotations, and then rectifying the images. Estimating the rectification includes the following: given relative pose information P, compute rotations $R_1$, $R_2$ for each image $I_1$, $I_2$ using a horizontal baseline assumption. Rectifying the images includes: given rectification rotation $R_1$, $R_2$ for $I_1$, $I_2$, reproject the image using these rotations and using differentiable grid-sampling to sample the location of the new pixels resulting in $I_{1rect}$, $I_{2rect}$. The differentiable rectification function is described in more detail in Example 2 (described later).

Because the pose P between the cameras may vary during operation of the autonomous vehicle, pose P is estimated using either a prior pose estimation performed by stereo rectification module 242, or, if no prior pose estimate exists, is set to an identity pose defining the original known distance between the cameras.

Once the first feature map 306 and second feature map 308 are rectified, stereo rectification module 242 applies positional feature enhancement by encoding positional data into the first feature map 306 and the second feature map 308 to produce a first encoded feature map 314 and a second encoded feature map 316. In one embodiment, positional data is encoded using 2D sine and co-sine positional encoding that is directly added to each feature map, adding an additional layer of spatial information that may be used during feature matching. The positional data enables stereo rectification module 242 to match features and to estimate the relative pose P with increased consistency. Application of the positional feature enhancement may be done directly to the first feature map 306 and the second feature map 308, or in other embodiments is performed on the first rectified feature map 310 and second rectified feature map 312. Encoding may be performed in two processes as follows, respectively:

$$p_{encoding}=[\sin(pos/C^{2k/d}), \cos(pos/C^{2k/d})]$$

$$f_{l2k}'=f_{l2k}+p_{encoding}$$

$$f_{r2k}'=f_{r2k}+p_{encoding}$$

where C=10000, d=64, pos∈w×h, k∈c, $f_{l2k}$ and $f_{r2k}$ are the first feature map 306 and second feature map 308, respectively, and $f_{l2k}'$ and $f_{r2k}'$ are the first encoded feature map 314 and second encoded feature map 316

Next, stereo rectification module 242 applies a transformer encoder to the first encoded feature map 314 and second encoded feature map 316 to produce a first enhanced feature map 318 and a second enhanced feature map 320. In some embodiments, the encoder used for this encoding includes 6 self-attention blocks, 6 cross-attention blocks, and a feed-forward network. The keys, queries and values come from the same feature map in self-attention phase, while the cross-attention maps are estimated across the two features specifically keeping the key-value pairs from one feature map and querying from the other feature map. In some embodiments, stereo rectification module 242 enforces fine-grained global matching by computing the attention maps across the entire feature map, as opposed to a windowed approach. This produces a first enhanced feature map 318 and a second enhanced feature map 320 ($F_l$, $F_r$).

Stereo rectification module 242 computes a correlation volume between the first feature enhanced map 318 and the second enhanced feature map 320. Correlation volume represents the matches found between the first feature map 306 and the second feature map 308. In some embodiments, the first feature map 306 and second feature map 308 are both flattened along the height by the width of each feature map, such that $F_l$, $F_r \in \mathbb{R}^{H \times W \times C}$ are flattened along H×W, where $F_l$ represents the first enhanced feature map 318, and $F_r$ represents the second enhanced feature map 320, producing a two-dimensional first feature map, and a two-dimensional second feature map. In some embodiments, the correlation volume is computed at various different stages, for example, from the first feature map 306 and second feature map 308, before the feature maps are not undergone enhancement or encoding. Correlation volume is computed as:

$$M_{vol}=F_l(F_r)^T/C, \in \mathbb{R}^{H \times W \times H \times W}$$

Once computed, the correlation volume is further simplified by applying a soft-max along the last two dimensions of $M_{vol}$ to result in $M_{match}$, where $M_{match}$ is a probability distribution, which represents the likelihood of a match for a specific location in the first enhanced feature map 318 to match all locations in the second enhanced feature map 320, as:

$$M_{match}=\text{softmax}(M_{vol})$$

In some embodiments, the stereo rectification module 242 determines the set of likely matches between across the first enhanced feature map 318 and the second enhanced feature map 320 and further learns reliable and un-reliable matches by performing further processing on the correlation volume. Stereo rectification module 242 passes the correlation volume into one or more decoder layers of the neural network model. The decoder layers may include a combination of 6× Convolution and Average Pooling layers. The decoder layers process the correlation volume and determine a set of likely matches between first and second enhanced feature map, or between first and second features maps 306, 308 in some embodiments, based on the correlation volume in the form of $M_{reduced} \in \mathbb{R}^{H \times W}$, where $M_{reduced}$ represents the most likely matches from the distribution encoded into $M_{match}$. $M_{reduced}$ is then flattened dimensionally to produce $M_{flatten}$. In some embodiments, the matching distributions shown by the correlation volume are visualized channel-wise as a matching distribution heatmap representing the likely matching features between the first feature map 306 and the second feature map 308. In some embodiments, $M_{flatten}$ may be a single-dimensional list of likely matches.

Once $M_{flatten}$ has been determined, stereo rectification module 242 computes a predicted relative pose based on the set of likely matches. $M_{flatten}$ is sent to a final linear layer to predict the relative rotation, $r_{pred}$. A Tanh operator is used to keep predictions bounded between [−1, 1] to ensure rotations are stable, as follows:

$$r_{correction}=\text{Tanh}(\text{Linear}(M_{flatten})) \in \mathbb{R}^{6 \times 1}$$

Following this, a 6D representation is used, focusing on predicting the x and y columns of the rotation matrix. Once computed, a predicted rotation matrix ($R_{pred}$) is computed based on the predicted relative pose and then is orthogonalized using Gram-Schmidt orthogonalization. The operations are as follows, given the x and y columns as $r_x$ and $r_y$:

$$r_{xnorm} = \frac{r_x}{\|r_x\|} \quad (3)$$

$$r_z = r_{xnorm} \times r_y$$

$$r_{znorm} = \frac{r_z}{\|r_z\|}$$

$$r_y = r_{znorm} \times r_{xnorm}$$

$$R_{GS} = [r_{xnorm}, r_y, r_{znorm}] \in SO$$

Next, the x and y columns are extracted from $R_{init}$ as $r_{init} \in \mathbb{R}^{6\times 1}$, finding that $R_{pred}$ is a valid rotation matrix:

$$r_{pred} = r_{init} + r_{correction}$$

$$R_{pred} = \text{GramSchmidt}(r_{pred}, p_{redy})$$

The predicted relative rotation, $R_{pred}$, is then used in conjunction with the rectification function to calibrate the stereo camera pair. In some embodiments, calibration is performed while a machine equipped with the camera pair is in operation in an "online" setting. Calibration is done through rectification of the first image 302 and the second image 304 ($I_l$ and $I_r$), where t is reused from ground truth pose information, as follows:

$$I_{rect}, I_{rrect} = \text{DRectify}(I_l, I_r, [R_{pred}|t_{gt}]).$$

Once rectified image pairs are obtained, stereo rectification module 242 then infers the flow in the x-axis (horizontal flow) and the y-axis (vertical flow). Given the rectified image pair for the first rectified image and the second rectified image, an architecture or software library is used to compute optical flow. In some embodiments, stereo rectification model may use Recurrent All-Pairs Field Transforms for Optical Flow (RAFT) pre-trained on the KITTI dataset to infer the horizontal and vertical flow.

Once the first image 302 and second image 304 are rectified into $I_{lrect}$ and $I_{rrect}$, any number of downstream tasks may be performed with increased accuracy using the rectified images. In some embodiments, a depth of an object that appears in both the first image 302 and the second image 304 may be estimated. This method of estimation produces accurate results when comparing to ground truth data, for example, as demonstrated with a visual depth estimate using Hierarchical Iterative Tile Refinement for Real-time Stereo Matching (HITNet) on the CARLA dataset. In some embodiments, one or more objects in the rectified images undergo object detection or semantic segmentation to identify the one or more objects.

Figure 4:
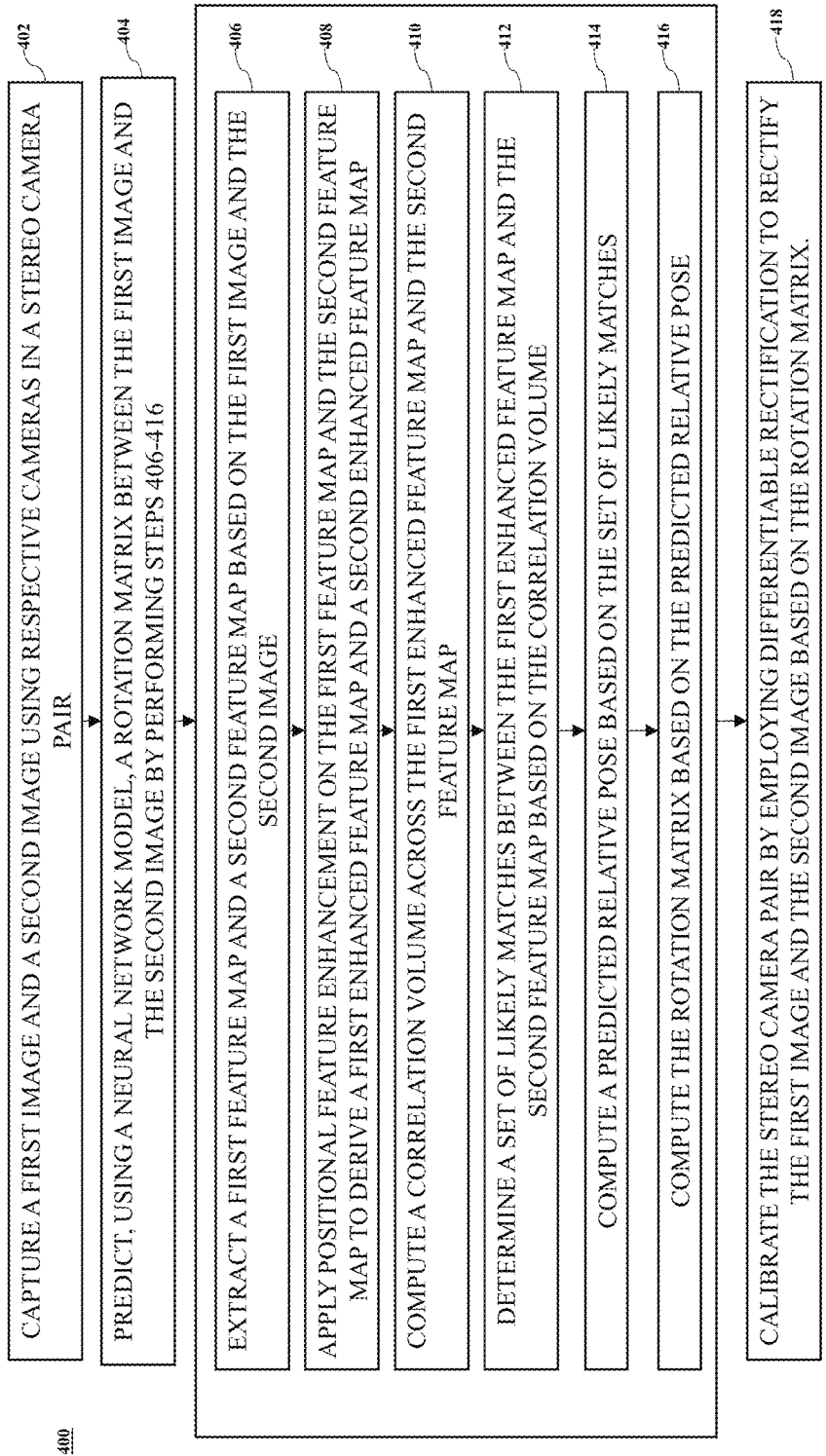
FIG. 4 is a flowchart showing a method of image rectification.

FIG. 4 is a flowchart of a method of stereo rectification. Method 400 may be implemented either as part of autonomous vehicle 100 or as part of autonomy computing system 200. Method 400 may be implemented using a memory storing computer executable instructions, and a processor coupled to the memory and to a stereo camera pair. The processor, upon execution of the computer executable instructions, is configured to execute the instructions.

Method 400 includes capturing 402 a first image and a second image using respective cameras in a stereo camera pair. Method 400 also includes predicting 404, using a neural network model, a rotation matrix between the first image and the second image.

Predicting 404 may include the following actions. Predicting 404 includes extracting 406 a first feature map and a second feature map based on the first image and the second image. With the feature maps in hand, apply 408 positional feature enhancement on the first feature map and the second feature map to derive a first enhanced feature map and a second enhanced feature map. Method 400 further includes computing 410 a correlation volume across the first enhanced feature map and the second feature map. Once a correlation volume is computed, method 400 further includes determining 412 a set of likely matches between the first enhanced feature map and the second feature map based on the correlation volume. Method 400 further includes computing 414 a predicted relative pose based on the set of likely matches. Method 400 further includes computing 416 the rotation matrix based on the predicted relative pose.

Once the predicting 404 has produce a rotation matrix, method 400 further includes calibrating 418 the stereo camera pair by employing differentiable rectification to rectify the first image and the second image.

In some embodiments, method 400 may include training the neural network model by a self-supervised learning. Training may include optimizing a loss function including a vertical optical flow of the first image and the second image. For example, training includes employing the differentiable rectification to the first image and the second image and adjusting the neural network model to minimize the vertical optical flow of the first image and the second image.

In some embodiments, calibrating 418 the stereo camera pair may further include calibrating the camera while a machine equipped with the camera pair is operating.

In some embodiments, extracting 406 the first feature map and the second feature map may further include employing the differentiable rectification to rectify the first feature map and the second feature map. Applying 408 the positional feature enhancement may further include applying the positional feature enhancement to the first rectified feature map and the second rectified feature map.

In some embodiments, computing 410 the correlation volume may further include flattening the first feature map along height by width of the first feature map to produce a two-dimensional first feature map, flattening the second feature map along height by width of the second feature map to produce a two-dimensional second feature map. Computing 410 may further include applying a soft-max along the last two dimensions of the correlation volume to convert the correlation volume into a likelihood of the set of likely matches.

In some embodiments, computing 414 the predicted relative pose may further include orthogonalizing the predicted relative pose using Gram-Schmidt orthogonalization.

In some embodiments, determining 412 the set of likely matches may further include determining a set of likely matches using a decoder layer of the neural network model.

In some embodiments, method 400 may further include training the neural network model according to a loss function: $L = \lambda_1 L_{rot} + \lambda_2 L_{flow}$, where $\lambda_1, \lambda_2$ are scalar weights, $L_{rot}$ is a pose loss supervised on ground truth calibration data, and $L_{flow}$ is a self-supervised vertical-flow loss. Training is described in more detail in the description of FIG. 5, below.

Figure 5:
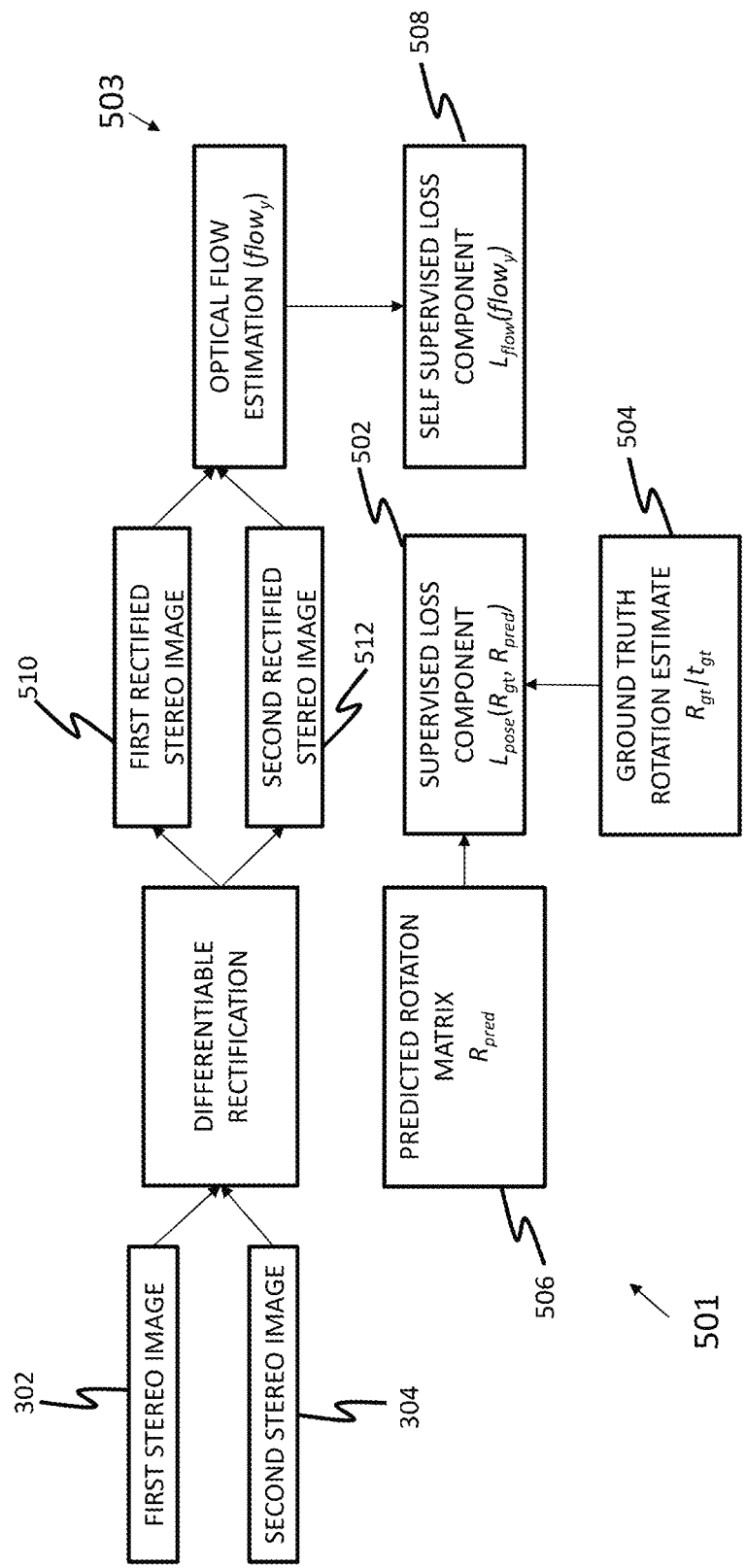
FIG. 5 is a flowchart showing training of the stereo rectification module.

FIG. 5 is a diagram showing training 500 the neural network model. The neural network model may be trained according to one or more loss components. For example, the neural network model is trained by optimizing a loss function, such as function: $L = \lambda_1 L_{rot} + \lambda_2 L_{flow}$, where $\lambda_1, \lambda_2 = 10$, 0.1 are scalar weights. $L_{rot}$ is a pose loss supervised on ground truth calibration data, and $L_{flow}$ is the self-supervised vertical-flow loss.

In the example embodiment, training 500 includes supervised training 501 and self-supervised training 503. In some embodiments, training 500 includes only supervised training 501 or only self-supervised training 503.

In the example embodiment, self-supervised training 503 includes inputting image pair 302, 304 to undergo differentiable rectification. As a result, a first rectified image 510 and a second rectified image 512 are derived. Optical flow is estimated between the rectified image pair 510, 512. The optical flow estimate flowy is used in the vertical flow self-supervised loss function.

In the example embodiment, self-supervised vertical flow loss component 508 is computed as:

$$L_{flow} = \frac{1}{N}\sum_{i=1}^{N}|\text{flow}_y|$$

In the above equation, $\text{flow}_y = \text{RAFT}(I_{lrect}, I_{rrect})$ and N is the total number of pixels in the image, and $I_{lrect}$, $I_{rrect}$ are first and second rectified images 510, 512. In some embodiments, the loss function is applicable to rectify vertical sensor or vertical camera setups, by minimizing for horizontal flow $\text{flow}_x$ rather than vertical flow $\text{flow}_y$.

In the example embodiment, a supervised loss component 502 using a ground truth estimate of rotation matrix $R_{gt}$ 504 to train the neural network model. In one example, supervised loss component 502 is an l1 loss, which is may be used in conjunction with the predicted rotation matrix $R_{pred}$ 506, yielding: $L_{rot} = \|R_{gt} - R_{pred}\|_1$, where $R_{pred}$ is a predicted rotation matrix 506. This loss assists the neural network model in narrowing down possible rotation estimates in the early training stages until reasonably stable rotations are obtained, at which point the self-supervised vertical flow loss dominates.

In operation, supervised training 501 is applied by optimizing supervised loss component 502. Supervised training 501 narrows down rotation estimates. Self-supervised training 503 is applied to fine-tune the neural network model such that rotation estimates with increased accuracy are provided and the camera pair is calibrated. Ground truth data are not needed in self-supervised training 503. In self-supervised training 503, the neural network model is trained by optimizing self-supervised loss component 508. For example, vertical optical flow 503 is minimized or nullified during the optimization of the self-supervised loss component 508. In one embodiment, in training, the neural network model is adjusted to minimize vertical flow between the first rectified image 510 and the second rectified image 512.

Systems and methods described herein are advantageous in providing deployment of stereo rectification module 242 and the associated rectification method in an "online" setting, during operation of a vehicle. The inclusion of self-supervised vertical flow component 502 removes the need for ground truth data, and the neural network model may be trained iteratively on previous loss and rotation predictions, when the vehicle is operating. Ground truth of real images are typically unavailable, especially when the vehicle is operating. Unlike supervised training, which is both time and computationally intensive, without the need for ground truth, the neural network model described herein becomes capable of deployment and training during use of a vehicle. The neural network model may be trained (or pretrained) with supervised training data, and the cameras are actively recalibrated during operation through use of the self-supervised training. The self-supervised vertical flow component 502 is not computationally intensive, capable of rapid deployment and iteration, and calibration is accurate and consistent.

Figure 6A:
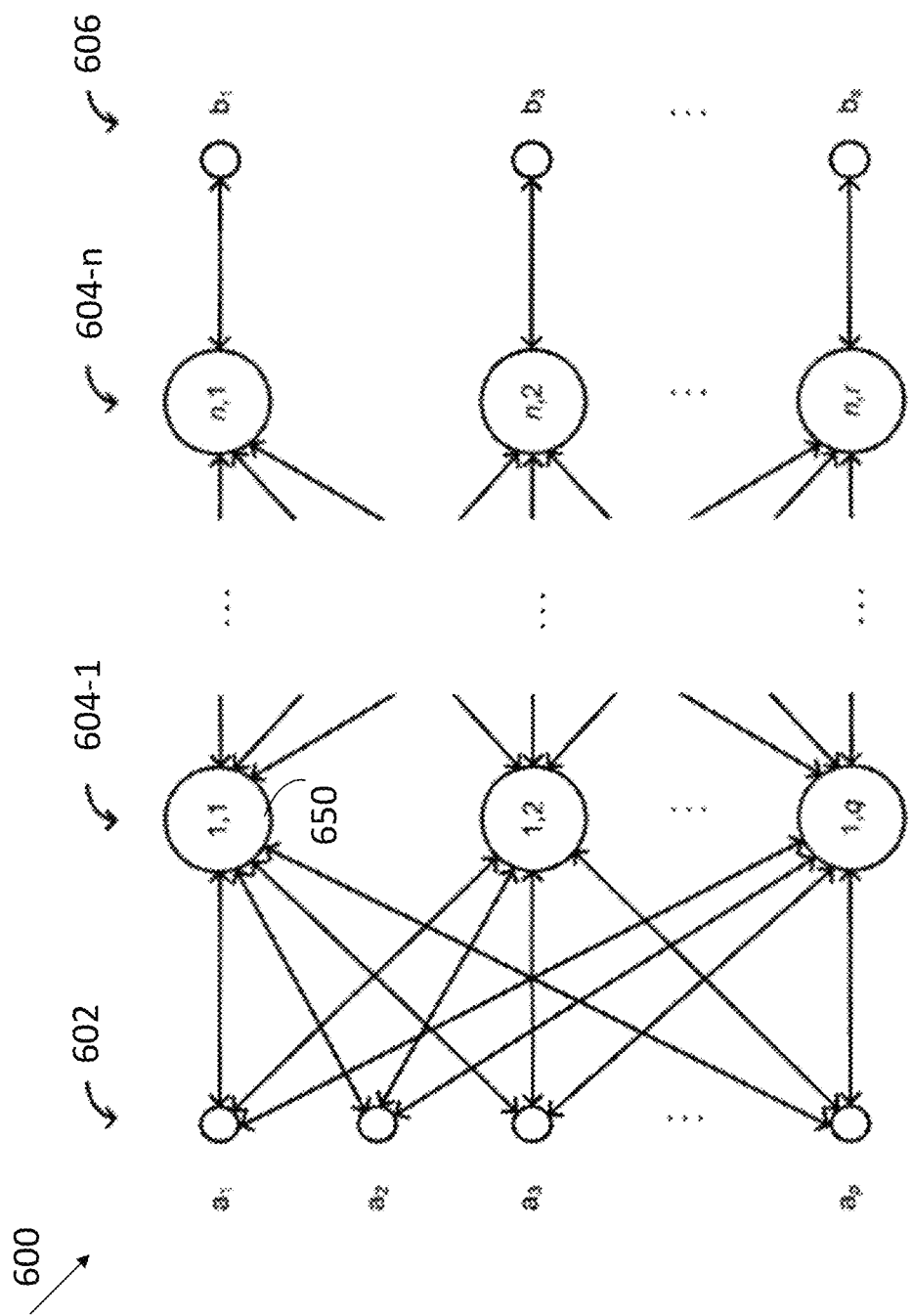
FIG. 6A is a block diagram of an example neural network.

FIG. 6A depicts an example artificial neural network model 600. The example neural network model 600 includes layers of neurons 602, 604-1 to 604-n, and 606, including an input layer 602, one or more hidden layers 604-1 through 604-n, and an output layer 606. Each layer may include any number of neurons, i.e., q, r, and n in FIG. 5A may be any positive integer. It should be understood that neural networks of a different structure and configuration from that depicted in FIG. 6A may be used to achieve the methods and systems described herein.

In the example embodiment, input layer 602 may receive different input data. For example, input layer 602 includes a first input $a_1$ representing training images, a second input $a_2$ representing patterns identified in the training images, a third input $a_3$ representing edges of the training images, and so on. Input layer 602 may include thousands or more inputs. In some embodiments, the number of elements used by neural network model 600 changes during the training process, and some neurons are bypassed or ignored if, for example, during execution of the neural network, they are determined to be of less relevance.

In the example embodiment, each neuron in hidden layer(s) 604-1 through 604-n processes one or more inputs from input layer 602, and/or one or more outputs from neurons in one of the previous hidden layers, to generate a decision or output. Output layer 606 includes one or more outputs each indicating a label, confidence factor, weight describing the inputs, and/or an output image. In some embodiments, however, outputs of neural network model 600 are obtained from a hidden layer 604-1 through 604-n in addition to, or in place of, output(s) from the output layer(s) 606.

In some embodiments, each layer has a discrete, recognizable function with respect to input data. For example, if n is equal to 3, a first layer analyzes the first dimension of the inputs, a second layer the second dimension, and the final layer the third dimension of the inputs. Dimensions may correspond to aspects considered strongly determinative, then those considered of intermediate importance, and finally those of less relevance.

In other embodiments, the layers are not clearly delineated in terms of the functionality they perform. For example, two or more of hidden layers 604-1 through 604-n may share decisions relating to labeling, with no single layer making an independent decision as to labeling.

Figure 6B:
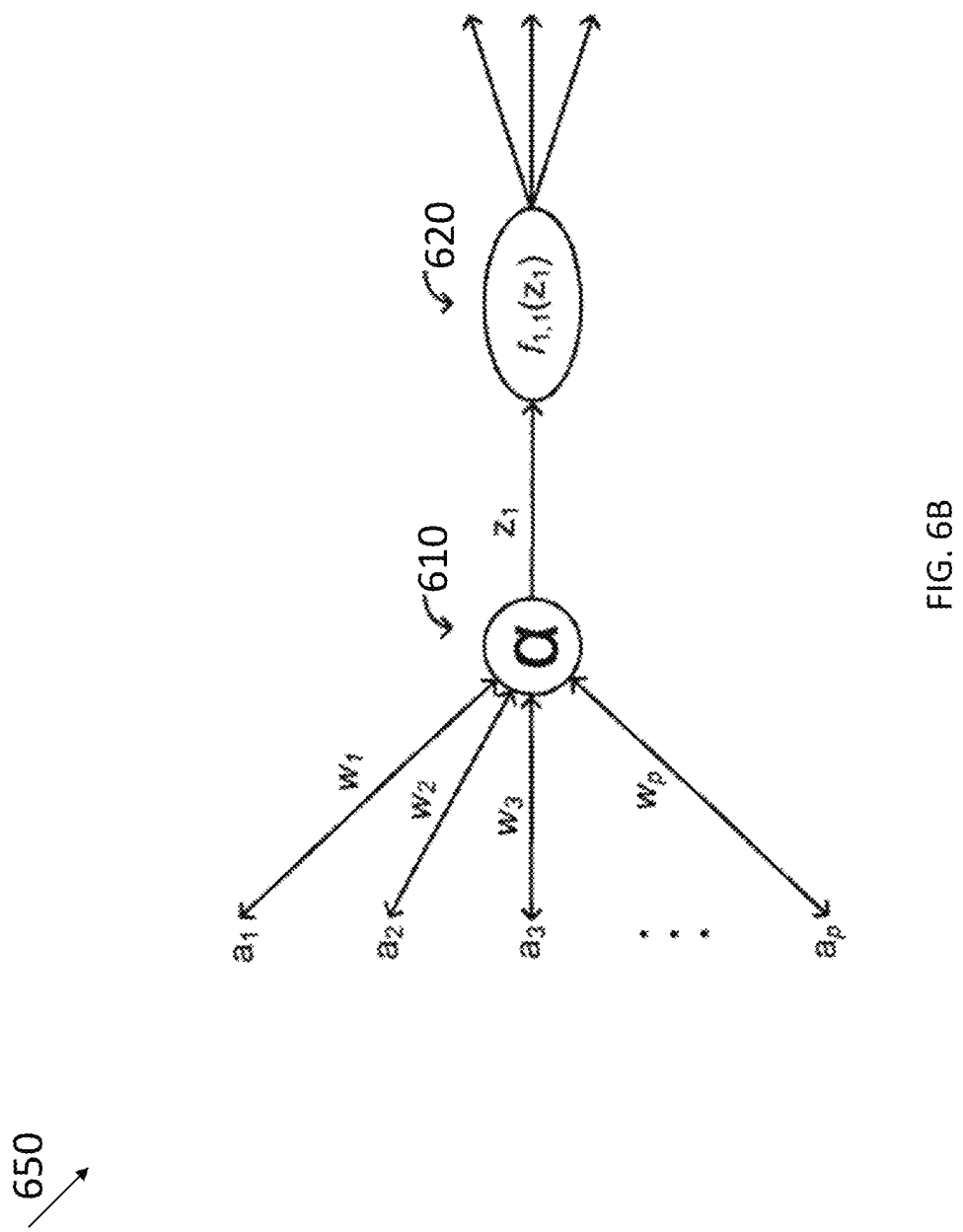
FIG. 6B is a block diagram of an example neural network.

FIG. 6B depicts an example neuron 650 that corresponds to the neuron labeled as "1,1" in hidden layer 604-1 of FIG. 5A, according to one embodiment. Each of the inputs to neuron 650 (e.g., the inputs in input layer 602 in FIG. 6A) is weighted such that input $a_1$ through $a_p$ corresponds to weights $w_1$ through $w_p$ as determined during the training process of neural network model 600.

In some embodiments, some inputs lack an explicit weight, or have a weight below a threshold. The weights are applied to a function α (labeled by a reference numeral 610), which may be a summation and may produce a value $z_1$ which is input to a function 620, labeled as $f_{1,1}(z_1)$. Function 620 is any suitable linear or non-linear function. As depicted in FIG. 5B, function 620 produces multiple outputs, which may be provided to neuron(s) of a subsequent layer, or used as an output of neural network model 600. For example, the outputs may correspond to index values of a list of labels, or may be calculated values used as inputs to subsequent functions.

It should be appreciated that the structure and function of neural network model 600 and neuron 650 depicted are for illustration purposes only, and that other suitable configurations exist. For example, the output of any given neuron may depend not only on values determined by past neurons, but also on future neurons.

Neural network model 600 may include a convolutional neural network (CNN), a deep learning neural network, a reinforced or reinforcement learning module or program, or a combined learning module or program that learns in two or more fields or areas of interest. Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. Neural network model 600 may be trained using unsupervised machine learning programs. In unsupervised machine learning, the processing element may be required to find its own structure in unlabeled example inputs. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics, and information. The machine learning programs may use deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Based upon these analyses, neural network model 600 may learn how to identify characteristics and patterns that may then be applied to analyzing image data, model data, and/or other data. For example, neural network model 600 may learn to identify features in a series of data points.

Figure 7:
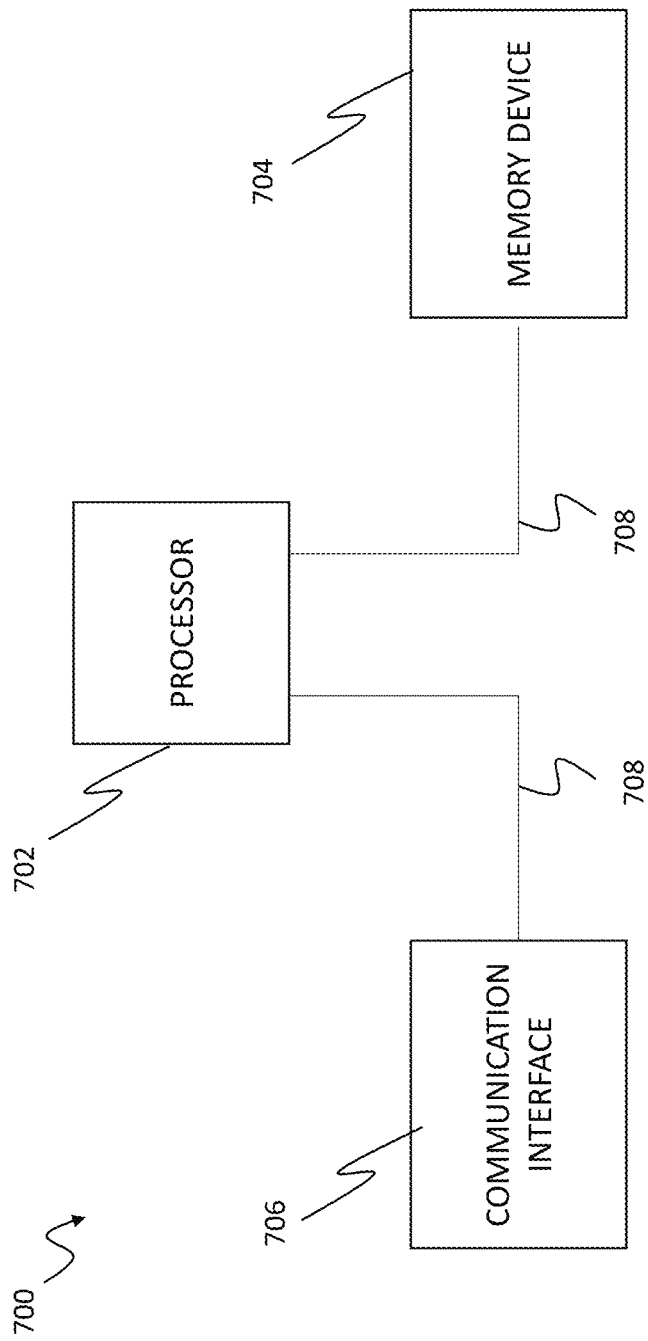
FIG. 7 is a block diagram of an example computing system.
Figure 8:
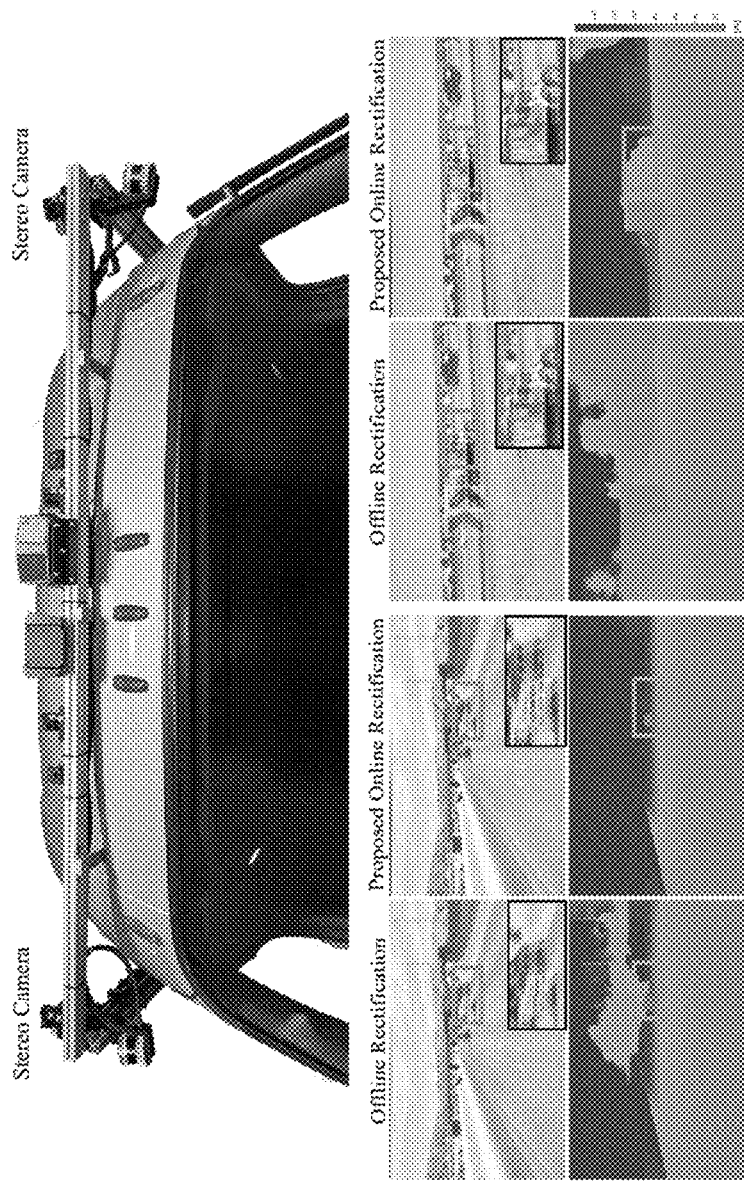
FIG. 8 is a diagram showing a stereo camera baseline and visual representations of improvements to depth estimation.
Figure 9:
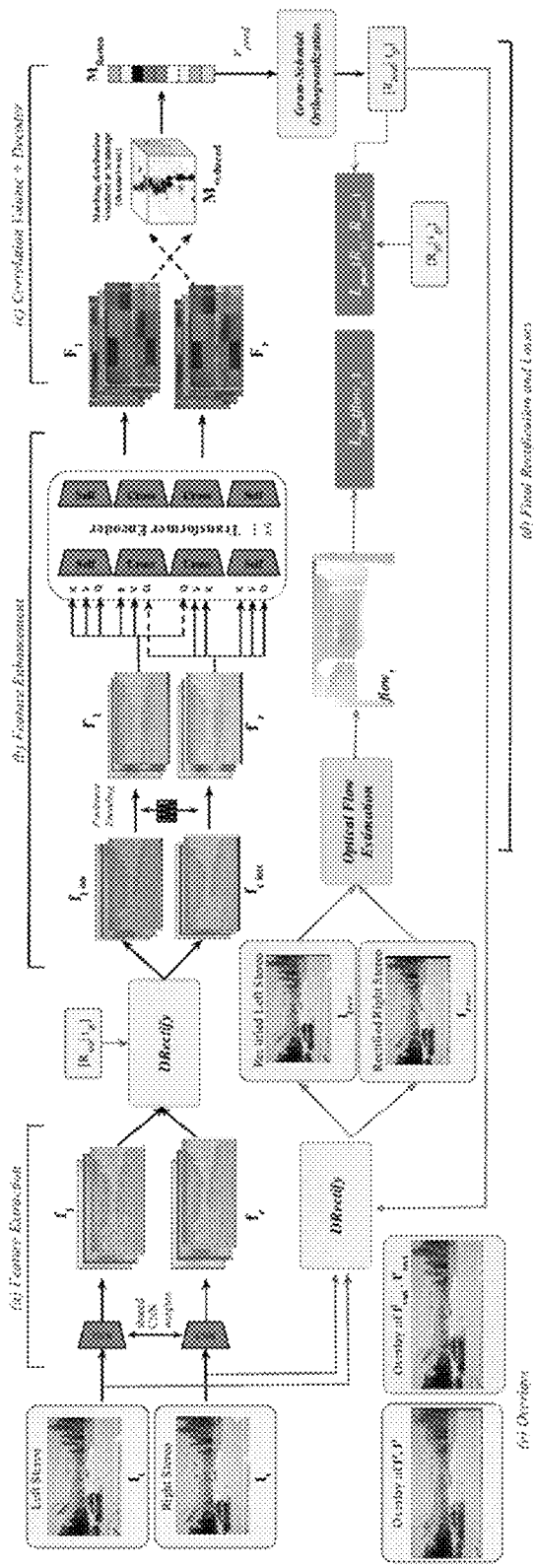
FIG. 9 is a flowchart overview of the stereo rectification process and training.
Figure 10:
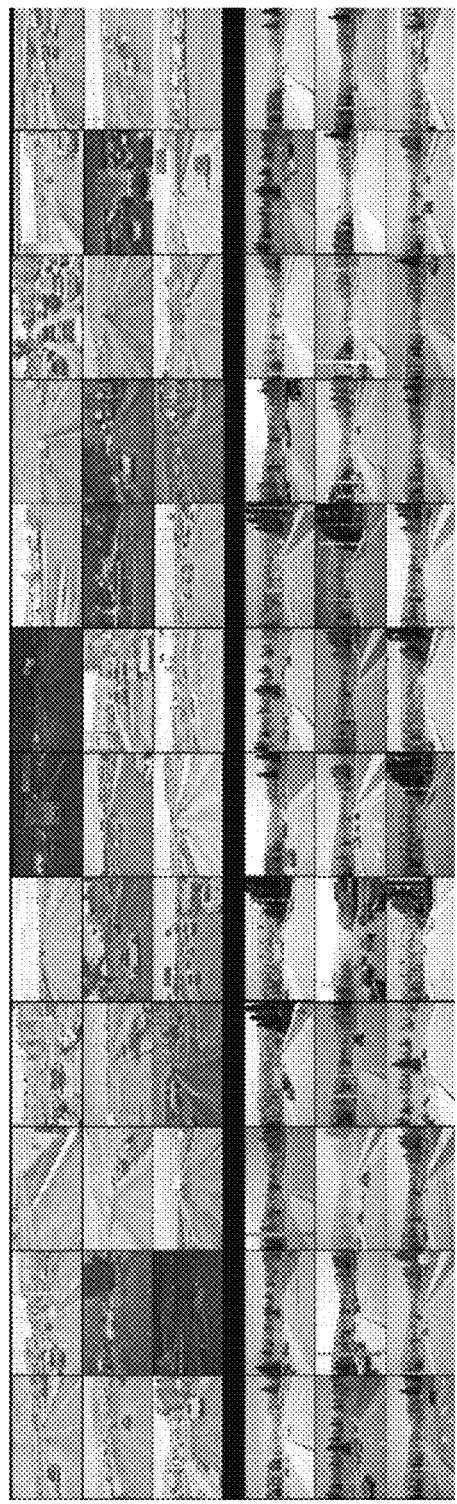
FIG. 10 shows the semi-truck high way dataset on the top three rows, and the synthetic CARLA dataset on the bottom three rows.

FIG. 7 is a block diagram of an example computing device 700. Methods described herein may be implemented with one or more computing device 700. Autonomy computing system 200 may include one or more computing device 700. Computing device 700 includes a processor 702 and a memory device 704. The processor 702 is coupled to the memory device 704 via a system bus 708. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 704 includes one or more devices that enable information, such as executable instructions or other data (e.g., sensor data), to be stored and retrieved. Moreover, the memory device 704 includes one or more computer readable media, such as, without limitation, dynamic random access memory (DRAM), static random access memory (SRAM), a solid state disk, or a hard disk. In the example embodiment, the memory device 704 stores, without limitation, application source code, application object code, configuration data, additional input events, application states, assertion statements, validation results, or any other type of data. The computing device 700, in the example embodiment, may also include a communication interface 706 that is coupled to the processor 702 via system bus 708. Moreover, the communication interface 706 is communicatively coupled to data acquisition devices.

In the example embodiment, processor 702 may be programmed by encoding an operation using one or more executable instructions and providing the executable instructions in the memory device 704. In the example embodiment, the processor 702 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) improving accuracy of stereo rectification in systems subject to miscalibration by improving the accuracy of stereo rectification through feature detection, enhancement, and neural network model training, (b) self-supervised training without the need of ground truth, (c) improving inference time and computation time for stereo sensor rectification by providing a computationally lightweight model capable of deployment in an "online" setting during vehicle use.

EXAMPLES

Example implementations of the systems and methods for stereo rectification and calibration are described herein.

Example 1

Stereo rectification is widely considered "solved" due to the abundance of traditional approaches to perform rectification. However, autonomous vehicles and robots in-the-wild require constant re-calibration due to exposure to various environmental factors, including vibration, and structural stress, when cameras are arranged in a wide-baseline configuration. Conventional rectification methods fail in these challenging scenarios: especially for larger vehicles, such as autonomous freight trucks and semi-trucks, the resulting incorrect rectification severely affects the quality of downstream tasks that use stereo/multi-view data. To tackle these challenges, a stereo rectification module having online rectification approach that operates at real-time rates while achieving high accuracy is described herein. Systems and methods described herein include a novel learning-based online calibration approach that utilizes stereo correlation volumes built from a feature representation obtained from cross-image attention. The module is trained to minimize vertical optical flow as proxy rectification constraint, and predicts the relative rotation between the stereo pair. The method is real-time and even outperforms conventional methods used for offline calibration, and substantially improves downstream stereo depth, post-rectification. Two public datasets, a synthetic and experimental wide baseline dataset, are provided.

1. Introduction

Wide baseline stereo methods with cameras separated meters apart may be a low-cost depth sensing method that allows, with double-digit megapixel resolutions, even long distance depth measurements beyond 100 meters range. Employed in autonomous trucks and large construction, farming robots, or UAVs, the mounted cameras experience significant vibrations which propagate to the stereo sensors leading to large deviations from offline calibration. Therefore, accurate "online" stereo calibration that occurs during operation of the vehicle is essential for the functionality of these sensor systems as part of the autonomous decision-making stack, especially for large long-haul vehicles where the mounting structures for large baselines may stretch and twist due to temperature and stress gradients. The quality of the calibration, addressed by the stereo rectification module, is essential to downstream tasks that aim to understand the environment around the vehicle, including stereo depth estimation, 3D object detection, semantic segmentation, and SLAM.

Since images exist in 2D space, stereo co-planarity enables efficient stereo matching and stereo depth estimation by nullifying the disparity in one of the axes, thereby reducing the matching search space to 1D. While perfect stereo co-planarity is difficult to achieve and maintain, stereo rectification aims to project a pair of images onto a common image plane such that there is no vertical disparity between corresponding pixels across the images.

Existing calibration and rectification methods typically rely on keypoint extraction and description methods using hand-crafted and learning-based features. Stereo rectification may be addressed using such traditional calibration approaches. A line of work formulates the rectification constraint using epipolar geometry, and these rely on existing optimization techniques like Gradient Descent and Levenberg-Marquardt to arrive at a rectified stereo pair. Other approaches focus on improving feature extraction and matching techniques, fundamental matrix computation and extrinsics estimation. These methods are not computationally permissive to deploy in an online setting during vehicle operation due to expensive optimization and intermediary steps. Those that may be deployed online compromise on accuracy resulting in significantly deteriorated downstream performance.

As a result of these limitations, today's accurate stereo calibration methods require a separate calibration step that uses visual patterns with known geometry to determine the intrinsics and extrinsics of the setup. These approaches mandate calibration in an offline setting, and it ignores environmental effects experienced by the sensors when in use. During inference in the wild, this significantly reduces accuracy and performance for downstream tasks.

Stereo rectification module provides an online rectification process, that may periodically re-rectify the sensors to address the poor calibration quality. To this end, stereo rectification module includes an online stereo pose estimation model that utilizes a correlation volume to determine relative pose between two cameras. Stereo rectification module uses a transformer encoder to produce strong feature representations built from global context and cross-view context. The neural network model of stereo rectification module is trained with weak supervision and a proxy rectification constraint which is computed in a self-supervised fashion. Stereo rectification module uses vertical optical flow to interpret the degree of vertical disparity and trains to minimize it. Additionally, stereo rectification module finds a 40% improvement in SIFT and SuperGlue keypoint-offset metric, when the novel self-supervised vertical flow constraint is employed. Further validation of the method is included by measuring the effect of rectification quality on state-of-the-art stereo depth estimation models (DLNR, HITNet). Stereo rectification module improves Mean absolute error (MAE) by 63% and 51% for depth estimation downstream using DLNR and HITNet, when evaluated on a real-world Semi-Truck Highway dataset and KITTI dataset, respectively. Further validation of the effectiveness of the method on a synthetic CARLA dataset with artificially induced severe perturbations that rarely occur in real-world captures is also included.

Provide in the figures is a Semi-truck Highway driving dataset and a CARLA dataset that capture calibration deterioration in real and synthetic settings, respectively.

Stereo rectification module is thus a novel learning-based stereo calibration model that utilizes stereo correlation volume to infer relative pose between a stereo pair, introducing a self-supervised vertical optical flow loss to train the model without the need for high-quality offline extrinsics, and outperforming all tested existing methods in the keypoint-offset metric and on downstream stereo depth estimation on real data while deployable in an online real-time setting.

2. Related Work

Traditional approaches to stereo rectification usually focus on computing rectification homographies without prior knowledge of the extrinsics of the cameras. The homographies are directly computed by optimizing on a formulation of the rectification constraint. Although computationally costly, some approaches use target bundle adjustment as a strategy to refine existing rectification quality. Some approaches propose to determine an arbitrary homography matrix for one of the cameras such that its epipole is pushed to infinity. Some approaches propose to use an optimization strategy that minimizes undersampling/oversampling of pixels after rectification. Some approaches optimize for rectification homographies by minimizing the first-order approximation of the reprojection error termed Sampson error. Several methods investigate decomposing the intermediate extrinsics and homographies into simpler transformations to optimize them individually.

A parallel direction focuses on the steps leading up to rectification, such as better establishing correspondences between views or improvements to fundamental matrix or extrinsics computation. Some approaches remove erroneous or noisy matches using various filters, and other approaches break down the computation of the fundamental matrix into its Taylor-series expansion. Finally, some approaches explore continuous online calibration for wide baseline scenarios and evaluate the effect of poor calibration on downstream tasks. While accurate, all of the above methods are computationally expensive and prohibit real-time calibration. The stereo rectification module is real-time and applicable in online settings while even reducing error of offline calibration methods.

Recently, learned methods attempt to circumvent errors in rectification. Some approaches propose a strategy of both 1D search and 2D kernel-based search for depth estimation from stereo images and other approaches address stereo rectification in laparoscopic images by introducing an intermediate vertical correction module to provide pixel-wise vertical corrections. Some approaches use a rectification network to predict rectification homographies for the task of view synthesis. Other approaches employ a 4-point parametrization of the rectification homography, which is estimated by a dedicated subnetwork and for downstream stereo matching. Some approaches focus solely on rectification alone using learned feature extractors. All of these methods propose refinement approaches to rectification instead of directly predicting rectification. It is hoped that the datasets introduced in this work may facilitate research towards rectification as a standalone task.

Stereo rectification is also tangentially related to relative pose estimation between multi-view images. Given two overlapping views, learning to estimate the relative rotation and translation between the views results in knowing the extrinsics between the two views. Early approaches such as PoseNet perform end-to-end camera pose estimation using CNNs. Several works build on early iterations by introducing elements to balance the losses from translation and rotation and architecture variations. Recently, DirectionNet explores optimizing quaternions as continuous representations for rotations. Other works incorporate flow to refine pose estimates from a coarse initialization. These methods warp source images onto the target frame, while stereo rectification module directly optimizes vertical flow which implicitly captures the rectification quality.

Several methods explore incorporating learned components into existing traditional approaches, for example DSAC is a differentiable RANSAC method. Similarly other methods include a learned model to estimate the fundamental matrix given feature matches and descriptors from SuperGlue. Other approaches use ViT to estimate cross attention weights between stereo image patches and then finally regress pose by directly estimating the orthonormal bases obtained from SVD decomposition of the Essential Matrix. Some approaches use a graph model that builds features correspondences across multi-view images inspired by SuperGlue followed by a coarse pose estimation using the 8-point algorithm which is further refined using a bundle adjustment step. Some approaches also explore using 2D-2D, 3D-3D correspondences in loop with learned depth estimation models and cost-volume based approaches for pose estimation. These existing pose estimation methods do not optimize the rectification constraint but rather optimize with 3D pose or epipolar constraints. However, applying pose estimations methods to rectification results in poor performance.

3. Flow-Guided Online Rectification

In contrast, systems and methods described herein follow the online rectification model and flow-guided training approach. Local feature-based pose estimation methods may perform poorly due to rolling-shutter effects coupled with mechanical vibrations on highway trucking scenarios. To address these challenges, stereo rectification module predicts pose directly from a stereo pair utilizing cross-attentional image features and stereo cost volume to optimize for pose. Furthermore, for real data solutions, they are only able to perform static offline calibration which does not hold under highway driving scenarios due to strong vibration. To this end, stereo rectification module relies on self-supervised vertical flow loss and use offline calibration as a semi-supervised rotation loss. As poor rotation may have a high impact on downstream tasks and the stereo baseline is fixed, the stereo rectification module model learns to estimate the relative rotation from a stereo pair.

The model operates on a pair of images which are fed to a shared CNN to extract shift-equivariant features. The features are then rectified using a prior pose estimate which may either be from previous estimation or set to identity. This is followed by a feature enhancement, which includes a positional embedding using a transformer encoder. The transformer encoder captures global information across both views using self-attention and cross-attention. Next, stereo rectification module employs a correlation volume to establish matches based on the features extracted from the transformer encoder. The volume represents a match distribution for every pixel in the feature map. The correlation volume is then processed by a decoder to implicitly learn to discern noisy matches and predict a simplified rotation estimate, which undergoes further processing to produce the final relative rotation prediction. Given the rotation prediction, the input images are rectified and the optical flow is estimated. With this flow estimate in hand, stereo rectification module minimizes the vertical flow.

3.1 Feature Extraction

Given a set of stereo pairs $I_l$ and $I_r \in R^{H \times W \times 3}$, stereo rectification module encodes these images using a weight-shared CNN backbone. The backbone comprises of 3 residual convolution blocks, resulting in a pair of feature maps $f_l, f_r \in R^{H \times W \times C}$. These features are limited in capturing globally discriminative features, ultimately, due to the fact that convolution operations are local in nature. While global representations are important to reduce ambiguous matches, lower dimensional feature representations lend to compute and memory advantages in the following stages. The systems and methods described herein extract global features while offering real-time runtime.

3.2 Positional Feature Enhancement

Stereo rectification module takes inspiration from transformer models, and employs positional encoding, specifically the 2D sine and cosine positional encoding (similar to DETR). The positional encoding is directly added to the CNN feature maps $f_l, f_r$, adding an extra layer of spatial information in addition to feature similarity during matching. This helps the model match features more consistently to estimate relative pose which is after all a spatial mapping of these features. Stereo rectification module encodes $$p_{encoding} = [\sin(pos/C^{2k/d}), \cos(pos/C^{2k/d})]$$

$$f_{l2k}' = f_{l2k} + p_{encoding}$$

$$f_{r2k}' = f_{r2k} + p_{encoding}$$

Where C=10000, d=64, pos∈w×h, k∈c. Following, stereo rectification module applies a feature enhancement transformer. The encoder comprises of 6 self-attention blocks and 6 cross-attention blocks and a feed-forward network. The keys, queries and values come from the same feature map in self-attention phase, while the cross-attention maps are estimated across the two features specifically keeping the key-value pairs from one set of features and querying from the other feature map. Stereo rectification module further enforces fine-grained global matching by computing the attention maps across the entire feature map as opposed to the windowed approach using SWIN transformers, as follows:

$$F_l = T(K=f_l', V=F_l', Q=f_r')$$

$$F_l = T(K=f_r', V=F_r', Q=f_r')$$

Here, T is the transformer encoder and K, V, Q correspond to the Key, Value and Query inputs. The enhanced features $F_l$, $F_r$ are used for computing a correction volume.

Stereo rectification module performs the positional feature enhancement mentioned above after an initial rectification step, $R_{init}$, i.e., $$f_{linit}, f_{rinit} = \text{DRectify}(f_l', f_r', P=[R_{init}|t])$$

Here, $R_{init}$ may either be identity (as used in experiments) or rotation from previous estimation. Subsequently, Fl, $F_r$ are computed from $f_{linit}$, $f_{rinit}$ following the steps described in this section. This enables stereo rectification module to standardize the variation in pose to a certain extent, and further allows us to formulate the model predictions as a correction applied to $R_{init}$.

3.3. Differentiable Rectification

A crucial component in the stereo rectification module model is the differentiable rectification module DRectify, enabling training end-to-end while inferring rectified images from the model pose predictions, which, in turn, enables us to add rectification constraints to the model during training. To define this operator, assume two images $I_1, I_2 \in R^{H \times W \times 3}$ and the relative pose between the sensors as $P=[R|t] \in SE(3)$ and intrinsics $K_1, K_2 \in R^{3 \times 3}$, and aim to project $I_1, I_2$ onto a common image plane using rectification rotations $R_1, R_2$ resulting in images $I_{1rect}, I_{2rect}$.

Given relative pose information P this step involves computing rotations $R_1, R_2$ for each image $I_1, I_2$ using the horizontal baseline assumption.

Given rectification rotation $R_1, R_2$ for $I_1, I_2$, reproject the image using these rotations and use differentiable grid-sampling to sample the location of the new pixels resulting in $I_{1rect}, I_{2rect}$. Detailed mathematical formulations for these two steps are described further herein.

3.4 Correlation Volume

Use a correlation volume to allow for global feature matching across the enhanced feature maps. Flatten both feature maps $F_l, F_r \in R^{H \times W \times C}$ along H×W. Then compute the correlation as follows $$M_{vol} = F_l(F_r)T/\sqrt{C} \in R^{H \times W \times H \times W}$$

This correlation volume computed across the flattened feature maps implicitly represents the matches across Fl and $F_r$. To further simplify this representation apply a soft-max along the last two dimensions of $M_{vol}$.

$$M_{match} = \text{softmax}(M_{vol})$$

$M_{match}$ represents the likelihood of a match for a specific location in Fl to all locations in $F_r$. The model learns reliable and un-reliable matches by further processing $M_{match}$ in the decoder as follows.

3.5 Decoder and Final Rectification

The decoder layers are comprised of a combination of 6×3D Convolution and Average Pooling layers, the result, $M_{reduced} \in R^{H \times W}$, representing the most likely matches from the distribution encoded into $M_{match}$. Then flatten $M_{reduced}$ to produce $M_{flatten}$ which is sent to the final linear layer to predict the relative rotation, $r_{pred}$. Since the model attempts to directly predict elements in the rotation matrix, the Tanh operator helps keep the predictions bounded [−1, 1] and therefore stable. Then, $$r_{correction} = \text{Tanh}(\text{Linear}(M_{flatten})) \in R^{6 \times 1}$$

Stereo rectification module uses the 6D representation which focuses on predicting the x and y columns of the rotation matrix. This step is followed by Gram-Schmidt orthogonalization. Given the x and y columns as $r_x, r_y$, The operations are as follows, given the x and y columns as $r_x$ and $r_y$:

$$r_{xnorm} = \frac{r_x}{\|r_x\|} \quad (3)$$

$$r_z = r_{xnorm} \times r_y$$

$$r_{znorm} = \frac{r_z}{\|r_z\|}$$

$$r_y = r_{znorm} \times r_{xnorm}$$

$$R_{GS} = [r_{xnorm}, r_y, r_{znorm}] \in SO$$

Next, the x and y columns are extracted from $R_{init}$ as $r_{init} \in R^{6 \times 1}$, finding that $R_{pred}$ is a valid rotation matrix:

$$r_{pred} = r_{init} + r_{correction}$$

$$R_{pred} = \text{GramSchmidt}(r_{predx}, r_{predy})$$

Rpred is a valid rotation matrix, which may be used to rectify the stereo input pair where t is reused from ground truth information as $$I_{lrect}, I_{rrect} = \text{DRectify}(I_l, I_r, [R_{pred}|t_{gt}]).$$

3.6 Training

Two main loss function used to train the model are described herein. The neural network model is trained according to a complete loss function: $L = \lambda_1 L_{rot} + \lambda_2 L_{flow}$, where $\lambda_1, \lambda_2 = 10, 0.1$ are scalar weights. $L_{rot}$ is a pose loss supervised on ground truth calibration data, and $L_{flow}$ is the self-supervised vertical-flow loss. In some embodiments, the neural network model is trained by a self-supervised learning.

Given rectified image pairs, use RAFT pre-trained on KITTI to infer the flow in the x-axis and y-axis. This loss function is self-supervised and is stable given the model predicts stable/valid rotation estimates. Since optical flow is an indirect method to establish dense correspondences across images, it is possible to leverage this flow to implicitly add a rectification constraint. Since the goal of rectification is to nullify the disparity along the vertical axes, the vertical flow component contains information about the presence of vertical disparity. Hence the loss function component is designed as follows.

$$L_{rot} = \frac{1}{N} \sum_{i=1}^{N} |\text{flow}_y|$$

Here, $\text{flow}_y = \text{RAFT}(\text{Ilrect, Irrect})$ and N is the total number of pixels in the image. Interestingly, this loss function is applicable to rectify vertical stereo setups as well, here the goal would be to minimize $\text{flow}_x$ rather than $\text{flow}_y$.

Also employ a second supervised loss using a ground truth estimate of the rotation matrix $R_{gt}$. An l1 loss is used, yielding $L_{rot} = \|R_{gt} - R_{pred}\|_1$.

The loss plays a crucial role in the early stages of training, allowing the model to narrow down the possible rotation estimates in the early training stages until reasonably stable rotation predictions are obtained and the self-supervised flow loss from above dominates.

3.7 Implementation

Implement stereo rectification module on the PyTorch framework including DRectify( ). The models are trained for 80-140 epochs depending on the dataset and the degree of misalignment between the images. Use the Adam Optimizer with a LR of $1e^{-4}$ coupled with exponential decay. Apply brightness, contrast, and color perturbations to the data as augmentations and interchange the left-right stereo pairs as an additional augmentation. Train on two NVIDIA-A40 GPUs with a batch size of 16. Input resolution is 512×512 pixels, while the main model is trained on one GPU, run flow estimation on the second GPU which is running inference on images of resolution 256×256. All inference time benchmarks are preformed on the NVIDIA-A40 GPU with a batch size of 1.

4. Stereo Rectification Datasets

The following section describes the real-world and synthetic datasets used to train and evaluate the method. Note the high scene diversity and the task difficulty associated with both datasets. Both datasets contain samples of data from different sequences/recordings, which in turn means every frame in the dataset is a unique frame.

4.1 Semi-Truck Highway Dataset (Real)

Setup: The stereo setup is mounted on a large semi-truck at approximately 3 m from the ground. The cameras are mounted on a rigid bar using an adjustable custom-made mount and calibrations are performed at the beginning and end of the drives to ensure correctness. The main sensor used in this dataset is the OnSemi AR0820 cameras which are built around a ½-inch CMOS sensor recording raw data in the RCCB format. The setup consists of 4 synchronized AR0820s in a 2 m wide baseline arrangement, with the baseline varying between 0.6 m and 0.7 m. The cameras record images at 15 Hz at a resolution of 3848'2168 pixels.

Scene Diversity: The dataset consists of recordings from geographically diverse locations in New Mexico and Virginia. The dataset comprises of diverse scenes from Highway and Urban areas, note given the capture vehicle is a semi-truck there are not collected samples from dense urban scenes. In addition, also provided is data with diverse natural lighting conditions ranging from afternoon, evening and night scenarios as well.

The dataset consists of 50,029 unique stereo pairs, captured with 4 cameras and offline calibration parameters for each camera. The 4 camera setup allows one to use up to 6 different combinations of stereo pairs, or even 3 or 4 cameras simultaneously. This is also essential for the rectification task considering the error in relative pose (from calibration) between any two cameras is unique. The data is sampled from scenarios where downstream stereo tasks performed inadequately due to poor rectification quality. The collected data validates the need for online rectification approaches due in long-haul journeys.

4.2 Carla Dataset (Synthetic)

Setup: rely on the CARLA driving simulator to simulate a further synthetic dataset with known ground truth pose information, and perhaps more importantly, the ability to simulate extreme pose deviations that are rare in real captures. The sensor setup here consists of 3 RGB Cameras, separated by a baseline of 0.8 m each mounted on a regular traffic vehicle. Each camera records at 30 hz capturing images of resolution 2560×1440.

Scene Diversity: simulate in a largely urban scene with traffic and some additional highway scenes. In order to add diversity, take advantage of lighting and weather controls in CARLA, to generate random scenes with a wide range of environmental effects. Similar to the trucking dataset, capture scenes with a variety of natural conditions such as dawn, morning, afternoon, dusk. Also added are random weather such as fog, rain, overcast and sunny scenes. Since the scenario remains unchanged throughout the recording, this results in highly similar scenes with different illumination and weather conditions.

This dataset consists of 7,722 stereo pairs, although smaller in comparison to the Trucking dataset, there is an introduction of significant perturbations, in the range of [−1, 1]°, to the camera extrinsics in all three axes of rotation. This makes it more challenging to evaluate on, and useful to indicate robustness (or lack thereof) in most rectification approaches. It is important to note no perturbations are introduced to the translation components. As above, the multi-camera setup enables us to sample different pairs for stereo rectification.

5. Experiments

In the following, the method is evaluated by evaluating on the test sets defined above and comparing baseline approaches. Also confirmed is the effectiveness of the design choices with ablation experiments.

Baselines. The model described herein is compared to traditional approaches and learned approaches to camera pose estimation. The learned components are incorporated in two ways. First, employ at keypoint-based approaches based on hand-crafted and learned features coupled with robust estimators such as l0-RANSAC and MAGSAC. Second, the stereo rectification module is compared to existing state-of-the-art end-to-end pose estimation models, including RPNet, DirectionNet and ViTPose. It is found that all methods perform well on existing pose estimation datasets, but struggle when evaluated on the wide baseline data.

To evaluate the rectification quality, a key-point offset metric is introduced in FIG. 11. The metric first finds keypoints using existing methods followed by matching across the stereo images. Then, the metric computes the average offset along the y-axis of the keypoint matches for two key-point types, SIFT and Superglue. MAE between the Ground Truth rectified images and the rectified images from each method is used to evaluate the rectification. Finally, report vertical flow offset measurements (which stereo rectification method is trained to minimize). Angular errors rotation estimates are also provided. Additionally, included are evaluations of downstream depth estimation models for insight into the correlation between rectification quality and stereo depth estimation. The MAE computed between ground truth depth and depth estimated from different rectification methods are included. Further discussion on the downstream evaluation is listed in the Supplementary Material.

5.1 Quantitative Analysis and Ablation Studies

The evaluation results are shown in FIG. 11. The KITTI evaluations, all with a narrow baseline and little pose variation, reveal the stereo rectification module method outperforms other approaches despite these approaches showing competitive results. Furthermore, the stereo rectification module method is favorable, even outperforming Ground Truth (offline calibration) as well. The evaluations on the CARLA dataset and Semi-Truck Highway dataset with severe pose variations capture robustness (or lack thereof) in all the methods. The stereo rectification module fares best in all metrics overall, outperforming Ground Truth (offline calibration) in Semi-Truck Highway and comparable to Ground Truth (simulation calibration) in CARLA. Additionally, the evaluations validate the importance of the novel self-supervised vertical flow loss (Ours (w/o OF)).

5.2. Effect on Downstream Depth Estimation

Figure 13:
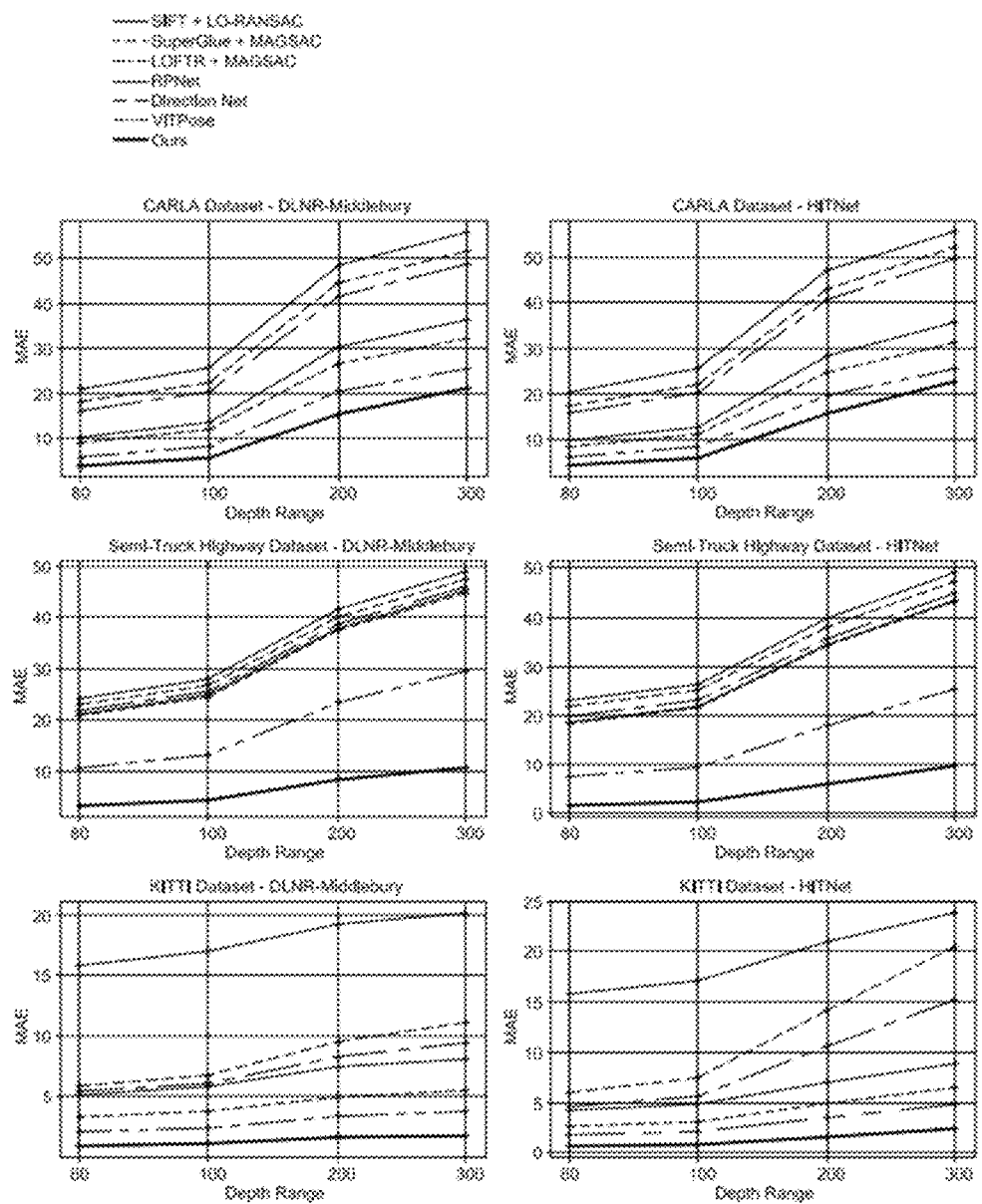
FIG. 13 is a series of charts showing Mean Absolute Error (MAE) of depth from various depth ranges with inputs from several rectification methods.
Figure 14:
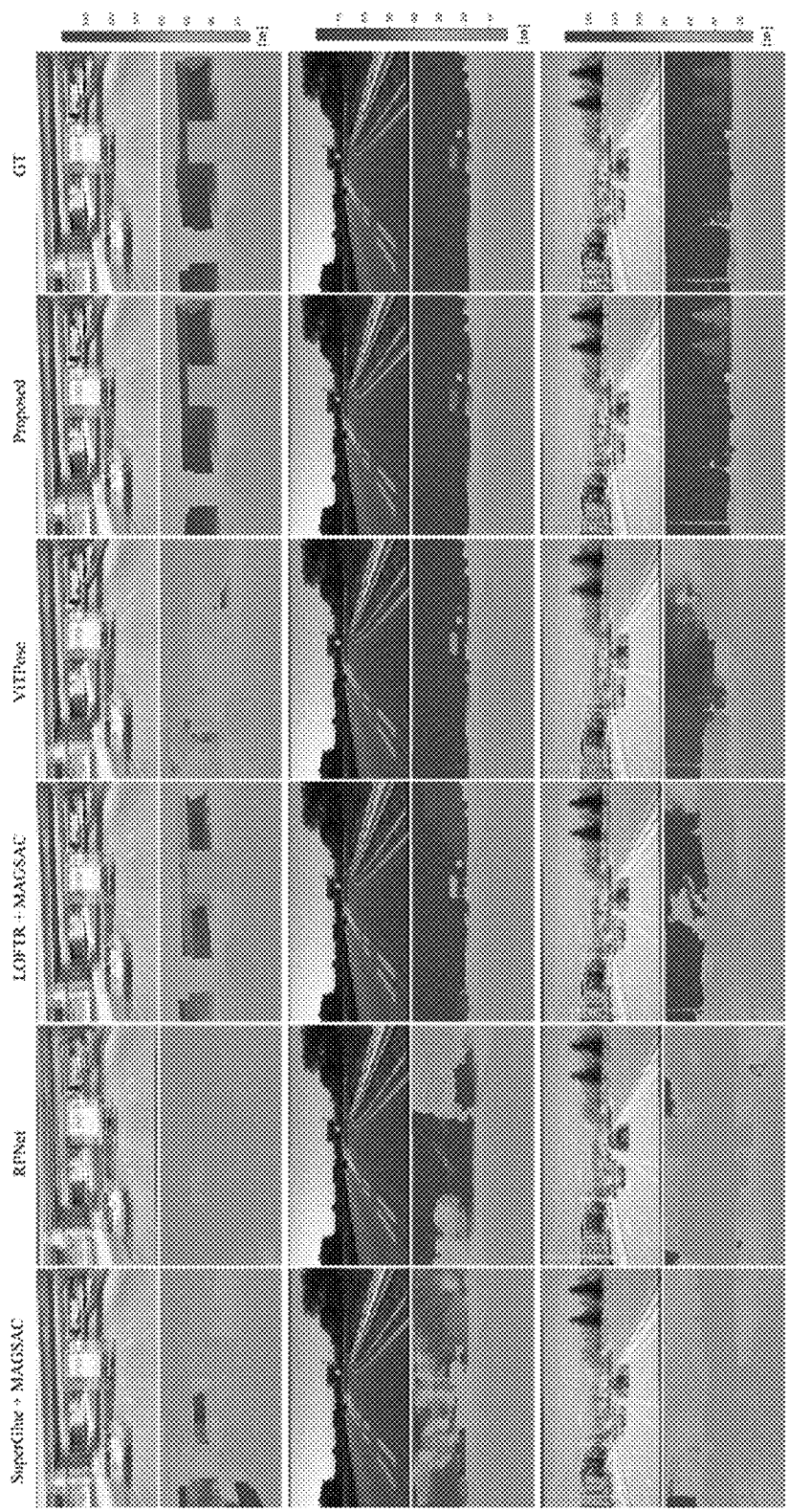
FIG. 14 is a depth estimation visual comparison using several rectification methods and datasets.

The effect of improved rectification on downstream task performance are evaluated and then the rectified images are passed using different approaches to two SOTA stereo models (HIT-Net and DLNR). FIG. 13 shows quantitative comparisons of MAE over different distances (note this MAE metric is different from FIG. 11 as it is computed against Ground Truth Depth) and FIG. 14 shows qualitative comparisons of rectification and resulting stereo depth. It is observed that there is a general trend of poor depth estimates at larger distances, which may be attributed to the model itself rather than the rectification. With this in mind, when using the method described herein, an outcome of a 17% improvement on average over [0-300]m in MAE on the CARLA dataset using DLNR, and a 10% improvement on average over [0-300]m on HITNet. On KITTI, it is observed that the MAE is similar to other methods but does improve on these metrics by 51% over the [0-300]m range on both SOTA models. Finally, a large performance gain is measured in MAE on the Semi-Truck Highway dataset, with over a 63% improvement on average over [0-300]m range in both models. This validates that the systems and methods described herein perform better in rectification and results in higher accuracy depth estimates.

6. Conclusion

Thus, the online stereo rectification method for wide baseline stereo setups aims to address the calibration degradation that occurs due to environmental effects and prolonged exposure. These effects manifest as vibrations, stretch and twist due to temperature and stress gradients. This method hinges on weak supervision from offline calibration and self-supervision using vertical flow. Stereo rectification module take a stereo correlation volume-based approach to establish correspondences and estimate relative rotation between a stereo pair. Stereo rectification module is trained and evaluated on the approach on two novel wide-baseline stereo datasets, one captured with a semi-truck on highways, and another simulated one with extreme pose variations. Stereo rectification module compares favorably to existing traditional and learned pose estimation and online calibration methods in terms of calibration accuracy and the accuracy of downstream stereo depth. Exciting future directions include multi-scale iterative refinement of calibration and simultaneous multi-camera rectification.

Example 2

1. Differentiable Rectification

A component in the model is the differentiable rectification module DRectify, which is described in the following. Being differentiable, this module enables training end-to-end while inferring rectified images from the model's pose predictions, which in turn enables employing rectification constraints to the model during training.

An example implementation of the DRectify function is described herein. Being differentiable, this enables training end-to-end while inferring rectified images from the model's pose predictions, which in-turn enables employing rectification constraints to the model during training. To define this operator, assume two images $I_1, I_2 \in \mathbb{R}^{H \times W \times 3}$ and the relative pose between the sensors as $P=[R|t] \in SE(3)$ and intrinsics $K_1, K_2 \in \mathbb{R}^{3 \times 3}$, and aim to project $I_1, I_2$ onto a common image plane using rectification rotations $R_1, R_2$ resulting in images $I_{1rect}, I_{2rect}$. This implementation uses differentiable implementations from existing coding libraries for conversion between rotation representations such as matrix2euler, euler2matrix, rodrigues2matrix. First, extract a relative rotation and translation estimate R and t from P and transform them to half-rotations as defined below:

Then, half-rotate the translation vector t to obtain:

$$t_{half} = R_{half} t$$

Half-rotations are preferred to minimize Field-of-View (FoV) loss in comparison to applying a full rotation to a single image of the stereo image pair.

Assuming a horizontal baseline, define an arbitrary unit vector $u \in \mathbb{R}^{3 \times 1}$ along the x-axis of $t_{half}$. Assuming u to be the ideal rectified baseline vector, now estimate a rotation that aligns $t_{half}$ in the direction of u. The vector is estimated as:

$$w = t_{half} \times u$$

The vector w is normal to the plane containing $t_{half}$, u, where w represents a direction vector implicitly capturing the rotation required to align $t_{half}$ to u. Next, w is converted to matrix representation through $w_R$=rodrigues2matrix(w). Then, $w_R$ is composed with $R_{half}$ to obtain the final rectification rotation homographies as follows:

$$R_1 = w_R R_{half}^T, R_2 = w_R, t_{rect} = w_R t_{half}$$

This is followed by construction of the rectification projection matrices, $P_{1Rect}, P_{2Rect} \in \mathbb{R}^{3 \times 4}$ and $Q \in \mathbb{R}^{4 \times 4}$ which is used to map disparity to depth.

The process from this point forward is described for a single pixel to simplify notation, but this is vectorized in DRectify for efficiency and reused for both the first image and the second image. A 2D pixel $p_{old}=(u, v, 1)$ is converted in homogenous coordinates to the normalized camera coordinates using $P_{rect}$, then homography $R_{rect}$ is applied, followed by projecting $p_{rect}$ in camera coordinates to pixels using K, as follows:

$$p_{norm} = (P_{rect})^{-1} p_{old}$$

$$p_{rect} = R_{rect}^T p_{norm}$$

$$p_{new} = K p_{rect}$$

Given the location of new pixel coordinates $p_{new}$, a differentiable remap( ) function is then applied to assign the pixel value at $p_{old}$ to $p_{new}$.

2. Network Architecture Details

Figure 15:
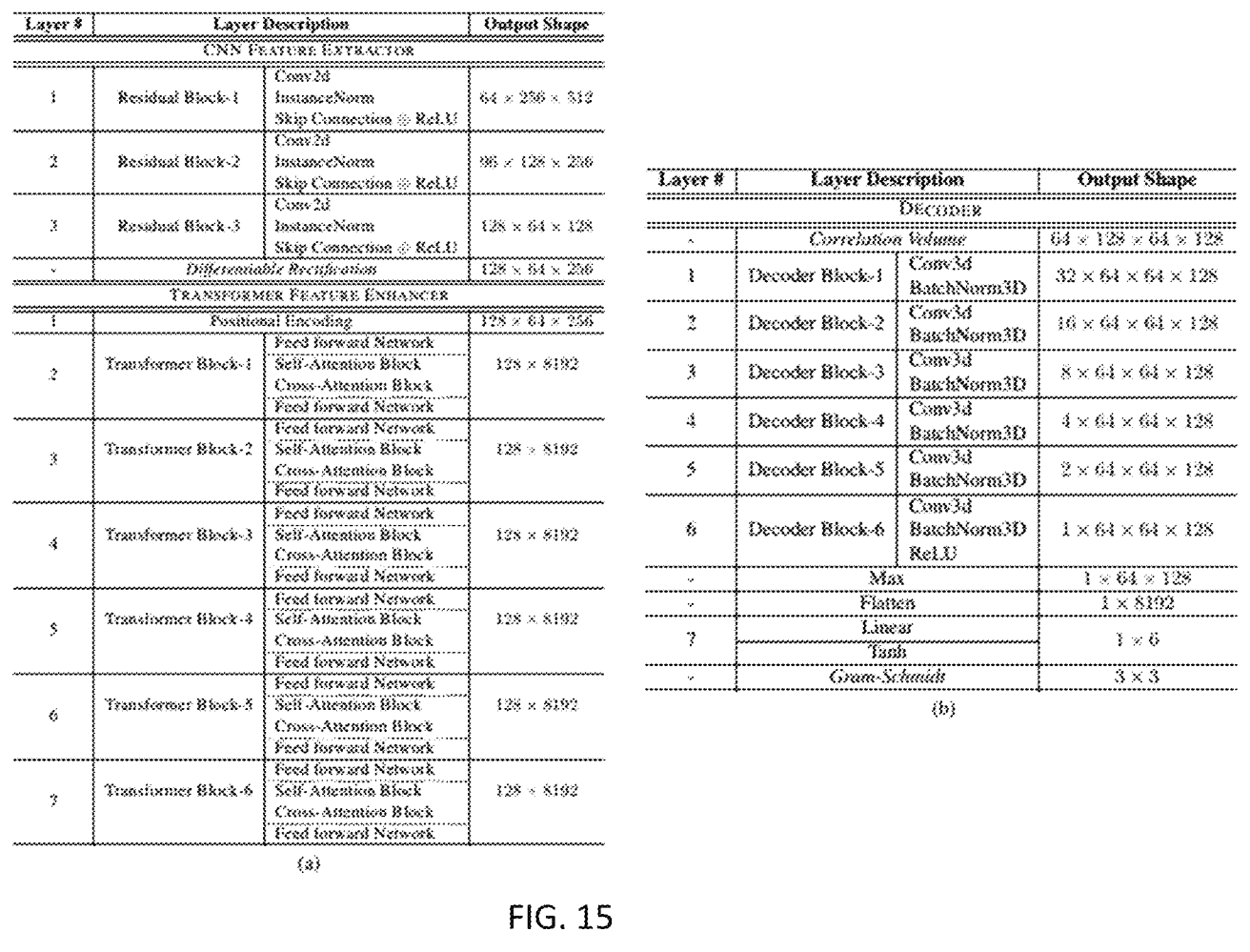

In this section, additional detail is provided on the network architecture of the stereo rectification module method. FIG. 15 (a) lists the architecture of the feature extractor and feature enhancer. The decoder architecture is listed in FIG. 15 (b) containing the layers and steps involved to produce a valid rotation prediction from the model. This rotation estimate is used to rectify the images using the differentiable rectification module described earlier. The differentiable rectification is also mentioned in FIG. 15 (a), this step corresponds to rectifying the features to an initial rotation estimates as described above.

3. Network Architecture Ablations

FIG. 16 evaluates the model described herein in the absence of key components from the Network Architecture. The experiments validate that the Feature enhancement play a significant role in the performance, as does Feature Rectification. Also observable is a drop in metrics in the absence of the Cost Volume, which replaces the cost volume and the decoder with aggregation (concatenation) of image features followed by a series of 2D Convolutions and Pooling operations before estimating rotation. Also observable is poor performance when trained on lower resolution images (256×256 for main model and 128×128 for flow estimation), while gaining 60% speedup in inference time. Included is w/o Optical Flow and the metrics of the methods described herein from FIG. 11, for reference.

4. Additional Stereo Depth Evaluations

Next, provided are additional evaluations that evaluate the rotation error as a metric typically evaluated to assess camera pose estimation approaches. FIG. 18 reports the errors in rotation measured in degrees along x (RX), y ($R_y$) and z ($R_z$) axes of rotation. These errors are computed as the mean absolute error between the ground truth relative rotation and the predicted relative rotation, after conversion to axis angle representation. On the real datasets, Semi-Truck Highway and KITTI, the stereo rectification module method consistently outperforms other methods. This is attributable to this to the present module being directly trained to reduce the rotation error. These metrics here since it is standard practice in general camera pose estimation approaches. On the CARLA dataset, featuring extreme pose variations, still performs best overall while other pose estimation methods are in a competitive range.

5. Additional Stereo Depth Evaluations

This section provides further evaluation of the effect of different rectification methods on downstream stereo depth estimation, in the presence of pose variation and de-calibration. Two publicly available off-the-shelf stereo models (HITNet and DLNR) are used for this evaluation. Given left and right input images ($I_L$ and $I_R$), first retrieve the depth map using ground-truth calibration in the following steps. Rectify $I_L$ and $I_R$ using ground-truth calibration parameters and get $I_L^{RECT}$ and $I_R^{RECT}$. Then, pass $I*_L^{RECT}$ and $I*_R^{RECT}$ to the stereo model and compute the depth map $Y*^{RECT}$. Finally, unrectify the depth map, yielding the reference depth $Y^*$ with ground truth calibration. For a given calibration method M, then estimate the depth by rectifying $I_L$ and $I_R$ using calibration parameters of M and get $I_L^{MRECT}$ and $I_R^{MRECT}$ Pass $I_{LMRECT}$ and $I_{RMRECT}$ to the identical stereo model from above and compute the depth map $Y_{MRECT}$, which is also unrectified to yield the estimated depth map $Y^M$ for method M. Given the predicted depth value of a pixel from $Y^M$ and the depth value of a pixel $y_i^*$ on $Y^*$ with ground truth calibration, the following metrics are evaluated:

Mean Absolute Error (MAE):

$$\frac{1}{N}\sum_i |y_i^* - y_i|$$

Root Mean Squared Error (RMSE)

$$\sqrt{\left(\frac{1}{N}\sum_i (y_i^* - y_i)^{\wedge}2\right)}$$

Scale Invariant Logarithmic error (SILog)

$$\frac{1}{N}\sum_i d_i^2 - \frac{1}{N^2}\left(\sum_i d_i\right)^{\wedge}2$$

Absolute Relative Error percent (AbsRel)

$$\frac{1}{N}|(y_i^* - y_i)/y_i^*|*100$$

Accuracy with threshold thr: percentage % of $y_i$, s.t., $$\max\left(\frac{y_i^*}{y_i}, \frac{y_i}{y_i^*}\right) = \delta < thr$$

Where thr is an element of $\{1.25, 1.25^2, 1.25^3\}$. Evaluate the metrics in binned [0, 80]m, [0-100]m, [0-200]m, and [0-300]m depth ranges. The stereo rectification module method consistently outperforms existing methods on the Semi-Truck Highway and KITTI and compares favorably on the CARLA dataset.

6. Additional Dataset Details

Figure 20:
FIG. 20 is a sample of the semi-truck dataset scenes.
Figure 21:
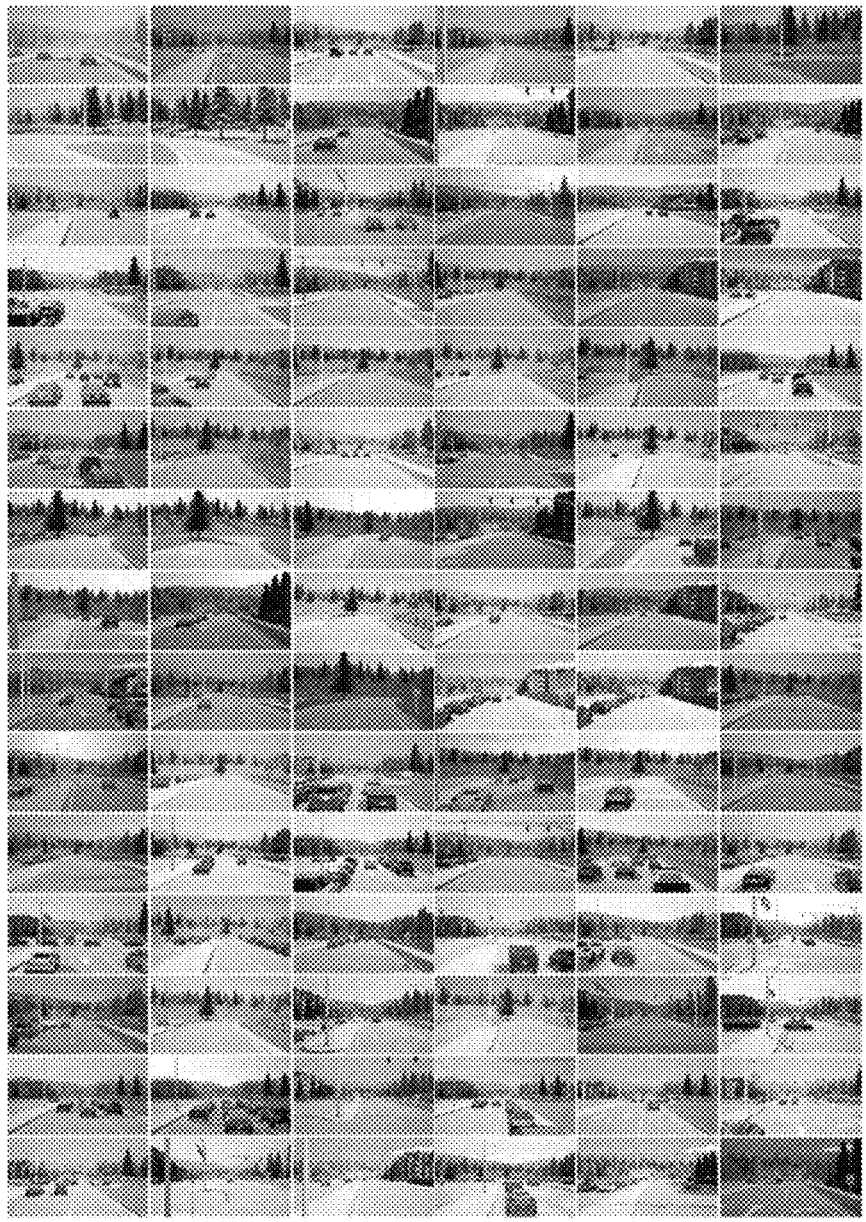
FIG. 21 is a sample of the CARLA dataset scenes.

Additional details and examples are included from the datasets, the Semi-Truck Highway dataset in FIG. 20, and a custom CARLA dataset in FIG. 21. The examples highlight the diversity in scenes, lighting and environment that were described above.

Figure 17:
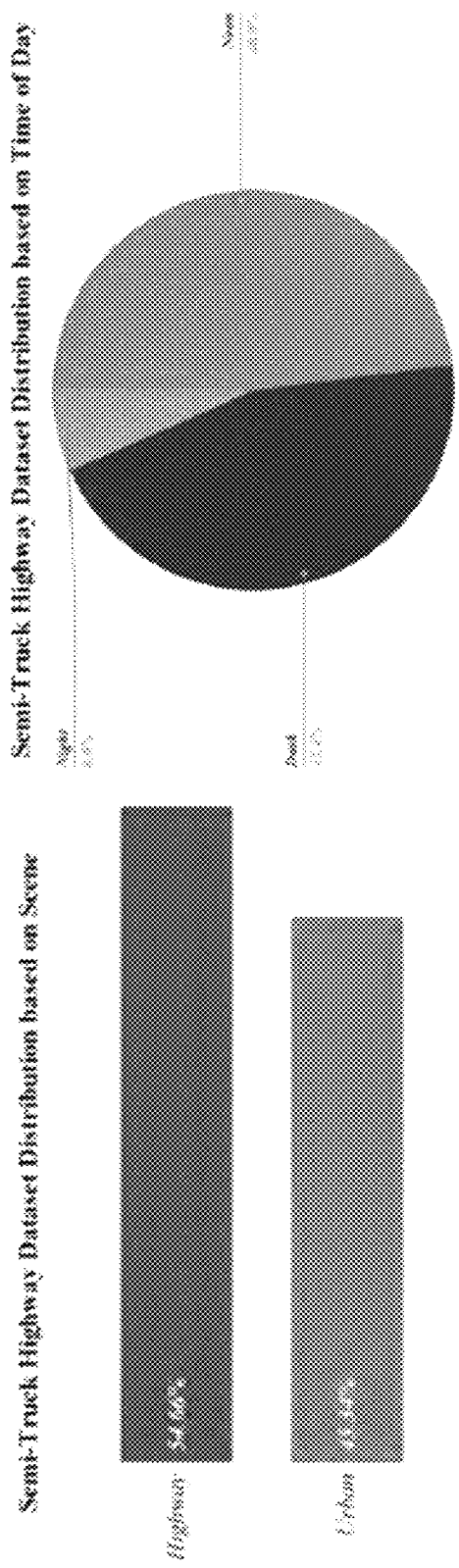
FIG. 17 is a summary of the data sample distribution of the two datasets.

The Semi-Truck Highway captures wide-baseline calibration deterioration naturally in a long-haul trucking operation setting. The dataset was captured with four front-facing 8 MP 20-bit RCCB HDR sensors (AR0820) with 30 degrees horizontal field of view lenses. The cameras were mounted on a single rigid bar placed on a truck at a height of approximately 3 m from the ground, and the cameras were distributed over a 2 m baseline with the baseline varying between 0.6 m and 0.7 m. The mounting plate for the cameras were custom-made to ensure that they are attached rigidly and there are no significant orientation differences between each pair. Offline calibration was performed before and after each capture drive to ensure consistency in the offline calibration parameters. Calibration was performed in two stages: lab-based offline intrinsic parameter estimation and on-site calibration using charts with clearly detectable patterns. Calibration captures were done while the vehicle was static, either in neutral or the engine turned off, to reduce any artifacts due to camera vibration and rolling-shutter effects. A total of 52 hours of data were collected in urban areas and highways under varying illumination conditions. FIG. 17 shows the scene and illumination distribution. Here, the distribution of data is included based on the scene (Highway, Urban) and the time of day which is split into (noon, dusk and night). Also provided are additional metrics on the Semi-Truck Highway dataset based on the time of day evaluations in FIG. 19. A breakdown of the metrics based on time of day is provided on the stereo rectification method and baseline methods, as seen in from the table the stereo rectification method performs well in challenging low light scenarios (Dusk and Night) with comparable metrics to daytime scenes (Noon).

The custom CARLA dataset was created to maximize the diversity of poses. While real data were captured across multiple capture campaigns to maximize the scene and illumination diversity, pose diversity is still hard to achieve in practice. To this end, CARLA is used to synthetically generate different pose variations while having a setup close to the Truck setup. For the synthetic dataset, used is the same 8 MP resolution cameras with a 30 degrees field of view but in RGB format. The cameras are placed at a height of 2.5 m from the ground and a baseline of 0.8 m between each pair. For the scenes, used are Town01 to Town06 with random waypoints. For each waypoint, the cameras poses are randomly perturbed before rendering the scene.

7. Additional Qualitative Images

Figure 22:
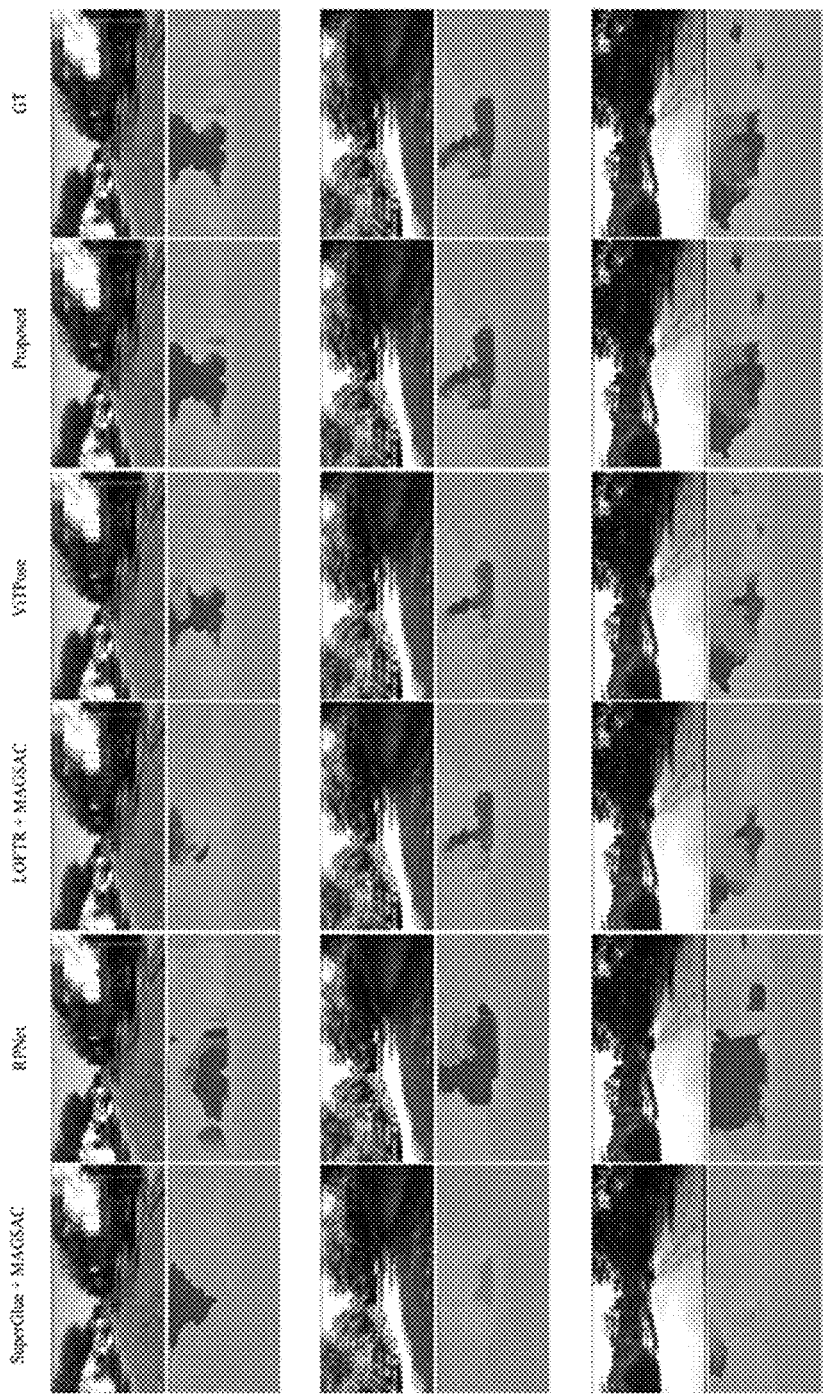
FIG. 22 is an example depth estimation for various rectification methods on the KITTI dataset.
Figure 23:
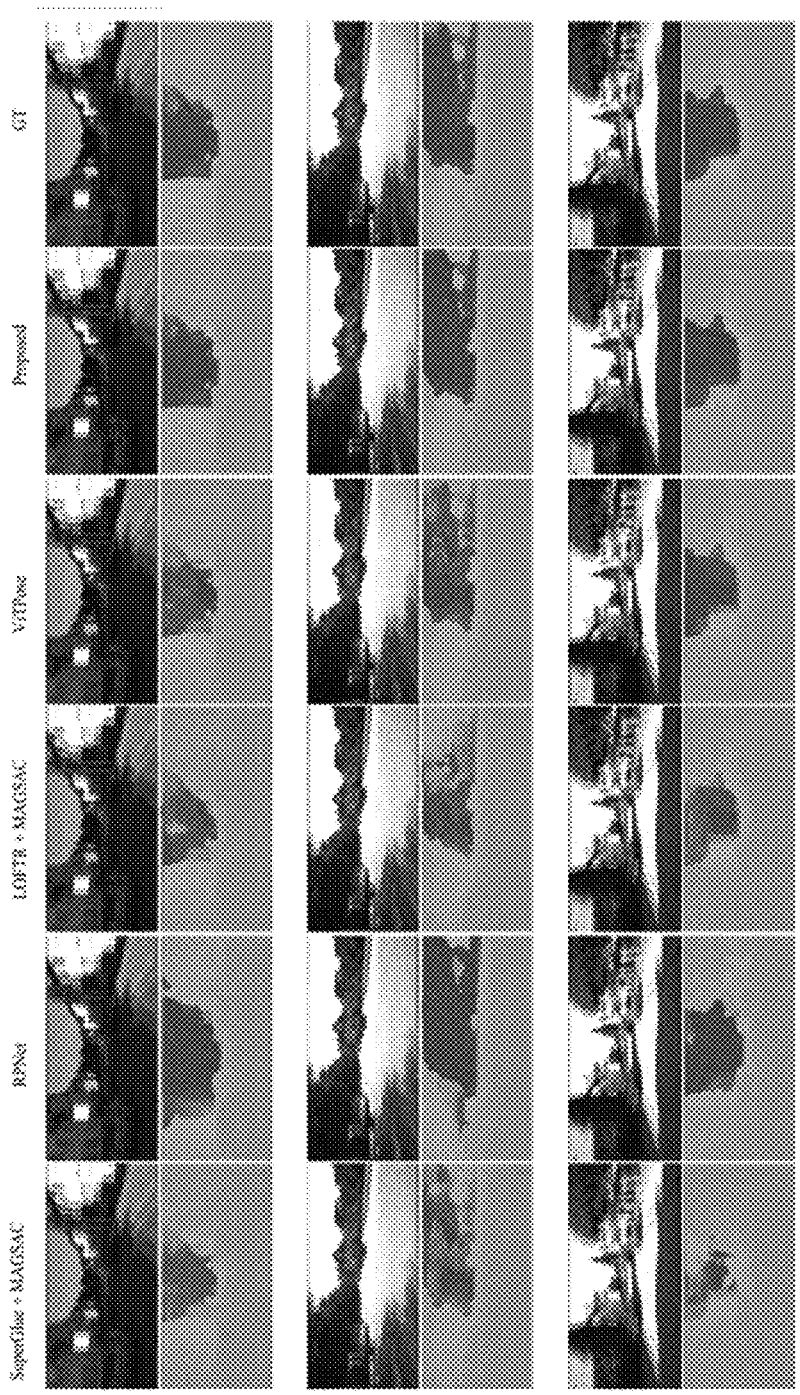
FIG. 23 is an example depth estimation for various rectification methods on the KITTI dataset.
Figure 24:
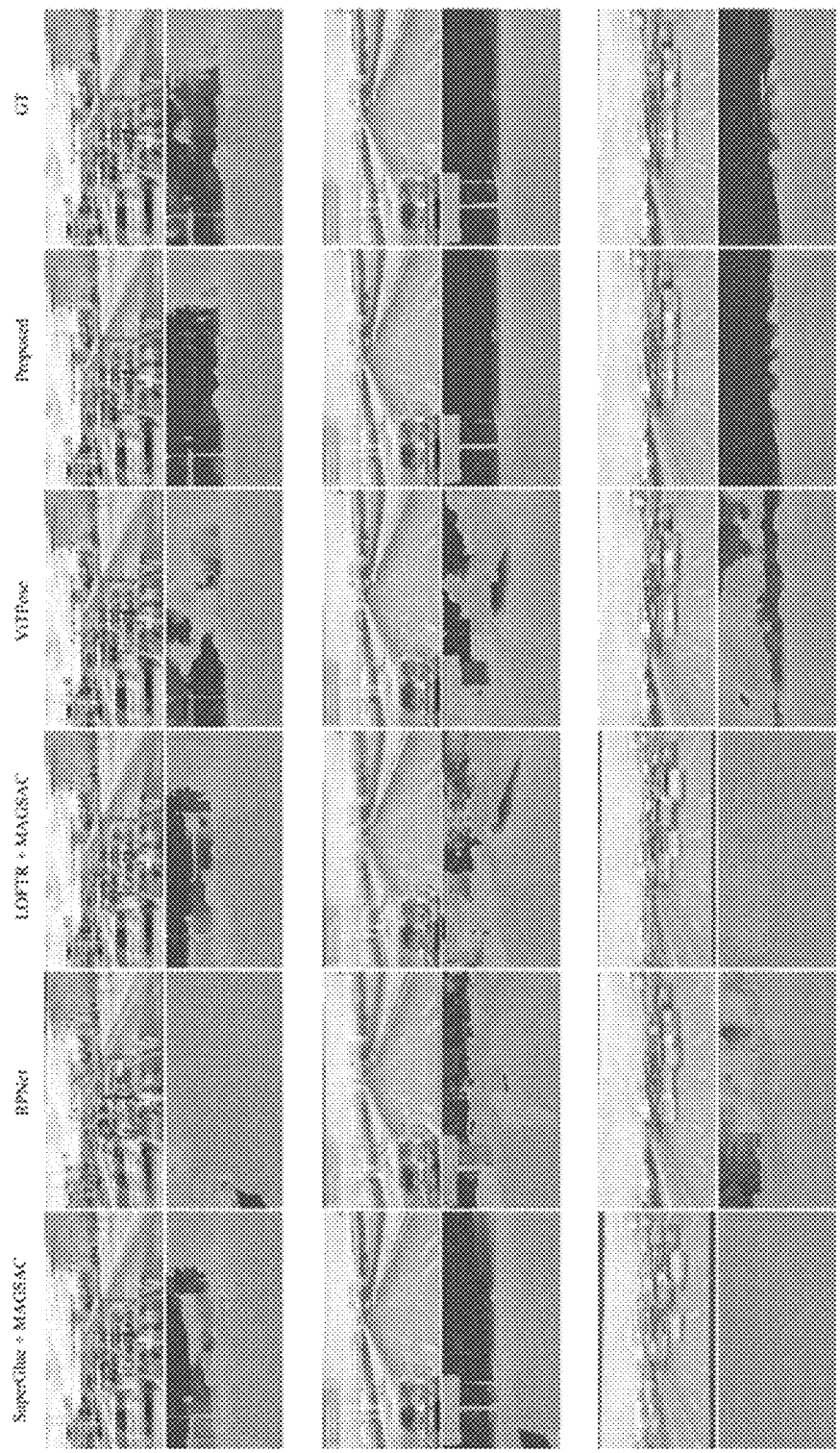
FIG. 24 is an example depth estimation for various rectification methods on the semi-truck highway dataset.
Figure 25:
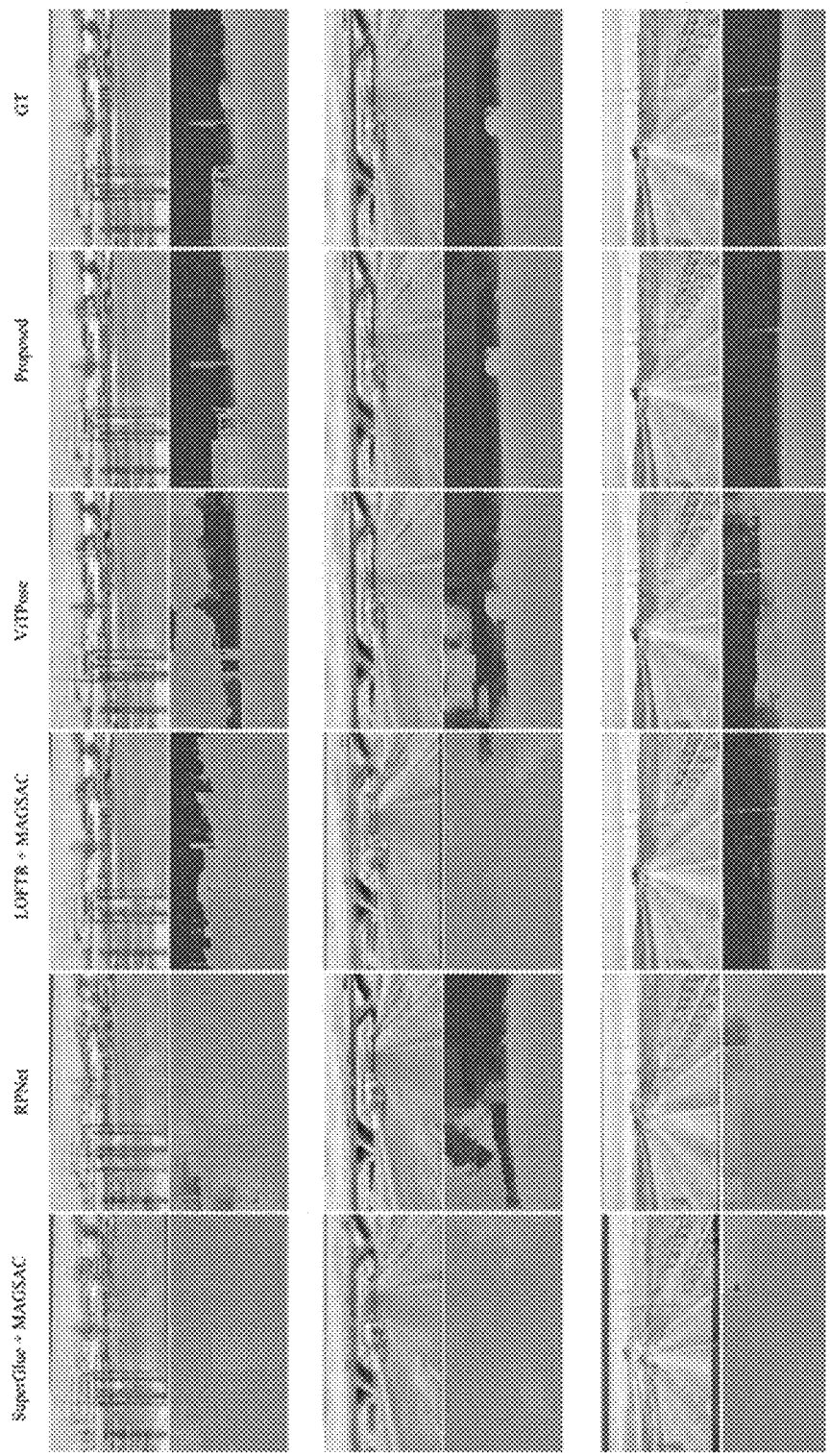
FIG. 25 is an example depth estimation for various rectification methods on the semi-truck highway dataset.
Figure 26:
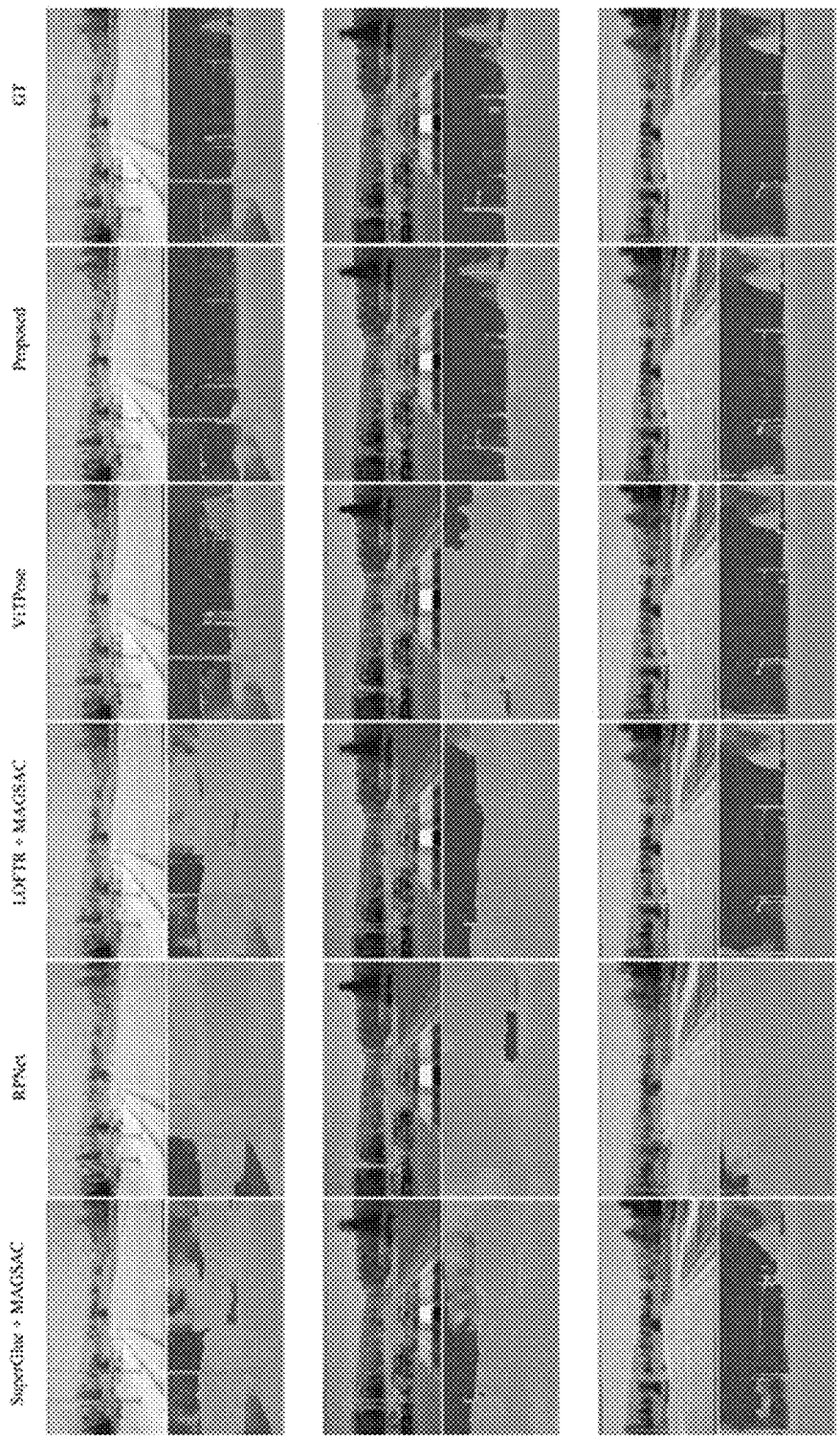
FIG. 26 is an example depth estimation for various rectification methods on the CARLA Dataset.
Figure 27:
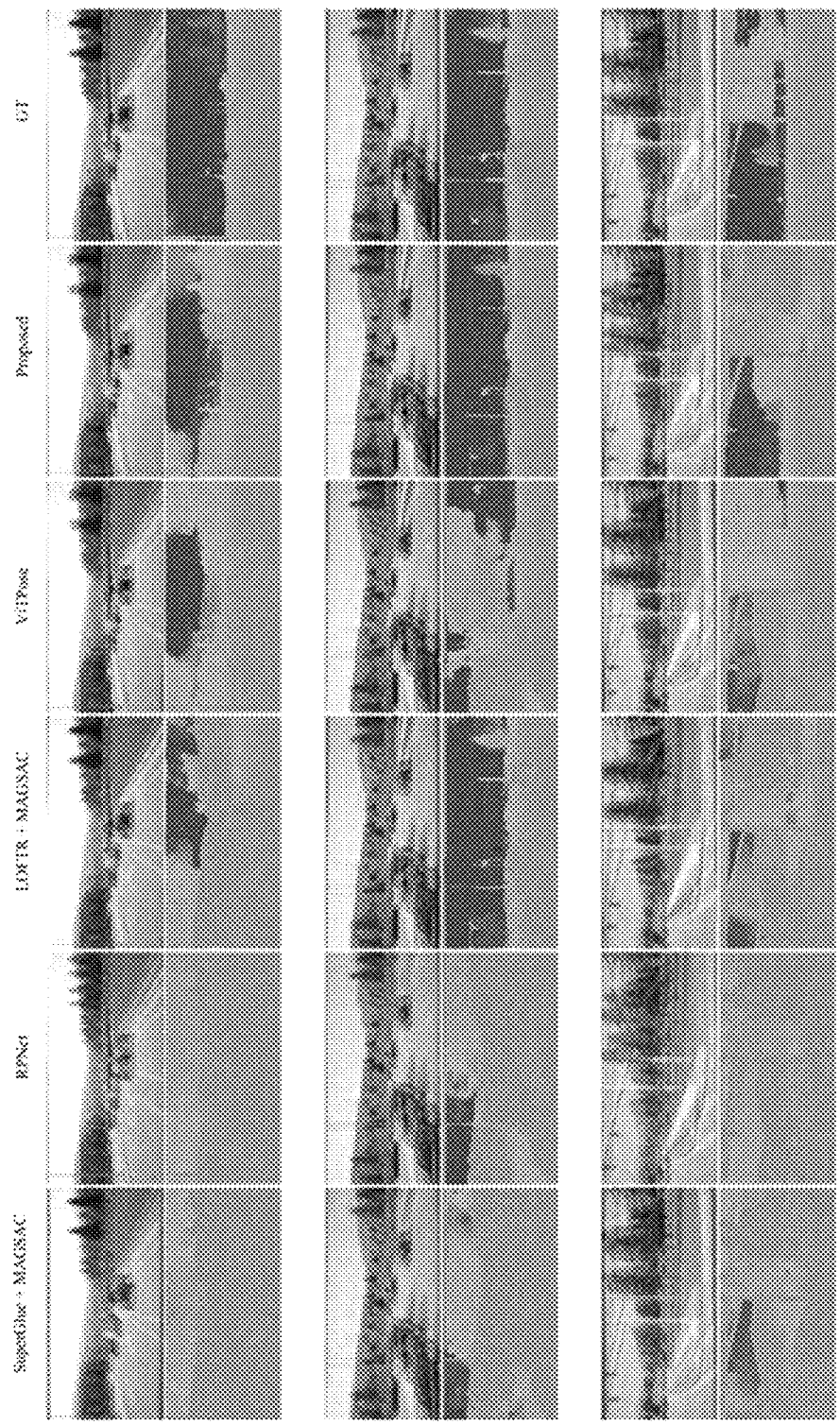
FIG. 27 is an example depth estimation for various rectification methods on the CARLA Dataset.

To provide further qualitative insight into the effectiveness of stereo rectification module method, there are additional qualitative images from all three datasets that are evaluated on. Overlay the left-right rectified stereo pairs and include the corresponding stereo depth inferred by HITNet on these images. For KITTI, it is seen that the model compares favorably as reported in FIG. 22 and FIG. 23. The evaluation on the semi-truck highway datasets highlights the effects of wide baseline calibration deterioration, see FIG. 24 and FIG. 25. The results on CARLA dataset show the model's ability to handle large pose variations while also displaying the challenge this dataset includes when comparing the results from the other methods, see FIG. 26 and FIG. 27. The method described herein handles significant pose variations in a diverse set of scenarios and lighting conditions, as also validated by the quantitative evaluations.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware may be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle comprising:
a stereo camera pair disposed on the autonomous vehicle, the stereo camera pair comprising a first camera and a second camera separated by a baseline distance, the first camera and the second camera configured to capture a first image and a second image, respectively;
at least one memory device storing computer executable instructions; and
at least one processor coupled to the at least one memory device and the stereo camera pair, the least one processor, upon execution of the computer executable instructions, configured to:
receive the first image and the second image captured using respective cameras in the stereo camera pair;
predict, using a neural network model, a rotation matrix between the first image and the second image by:
extracting a first feature map and a second feature map based on the first image and the second image;
applying positional feature enhancement on the first feature map and the second feature map to derive a first enhanced feature map and a second enhanced feature map;
computing a correlation volume across the first enhanced feature map and the second enhanced feature map;
determining a set of likely matches between the first enhanced feature map and the second enhanced feature map based on the correlation volume;
computing a predicted relative pose based on the set of likely matches; and
computing the rotation matrix based on the predicted relative pose; and
calibrate the stereo camera pair by:
employing differentiable rectification to rectify the first image and the second image based on the rotation matrix.

2. The autonomous vehicle of claim 1 wherein the first camera and the second camera are positioned laterally at least 60 cm apart.

3. The autonomous vehicle of claim 1, wherein the at least one processor is further configured to:
train the neural network model by a self-supervised learning.

4. The autonomous vehicle of claim 1, wherein the at least one processor is further configured to:
train the neural network model by optimizing a loss function including a vertical optical flow of the first image and the second image.

5. The autonomous vehicle of claim 4, wherein the at least one processor is further configured to train the neural network model by:
employing the differentiable rectification to the first image and the second image; and
adjusting the neural network model to minimize the vertical optical flow of the first image and the second image.

6. The autonomous vehicle of claim 1, wherein the at least one processor is further configured to:
calibrate the stereo camera pair by calibrating the camera pair while an autonomous vehicle equipped with the camera pair is operating.

7. The autonomous vehicle of claim 1, wherein the at least one processor is further configured to:
extract the first feature map and the second feature map further by:
employing the differentiable rectification to rectify the first feature map and the second feature map; and
apply the positional feature enhancement by:
applying the positional feature enhancement to the first rectified feature map and the second rectified feature map.

8. The autonomous vehicle of claim 1, wherein the at least one processor is further configured to:
compute the correlation volume by:
flattening the first feature map along height by width of the first feature map to produce a two-dimensional first feature map; and
flattening the second feature map along height by width of the second feature map to produce a two-dimensional second feature map.

9. A computer-implemented method of calibrating a stereo camera pair, the method comprising:
capturing a first image and a second image using respective cameras in a stereo camera pair;
predicting a rotation matrix between the first image and the second image by:
extracting a first feature map and a second feature map based on the first image and the second image;
applying positional feature enhancement on the first feature map and the second feature map to derive a first enhanced feature map and a second enhanced feature map;
computing a correlation volume across the first enhanced feature map and the second enhanced feature map;
determining a set of likely matches between the first enhanced feature map and the second enhanced feature map based on the correlation volume;
computing a predicted relative pose based on the set of likely matches; and
computing the rotation matrix based on the predicted relative pose; and
calibrating the stereo camera pair by:
employing differentiable rectification to rectify the first image and the second image based on the rotation matrix.

10. The method of claim 9 further comprising:
training the neural network model by a self-supervised learning.

11. The method of claim 9, further comprising:
training the neural network model by:
optimizing a loss function including a vertical optical flow of the first image and the second image.

12. The method of claim 11, wherein the training the neural network model further comprises:
employing the differentiable rectification to the first image and the second image; and adjusting the neural network model to minimize the vertical optical flow of the first image and the second image.

13. The method of claim 9, wherein the calibrating the stereo camera pair further comprises:
calibrating the camera while a machine equipped with the camera pair is operating.

14. The method of claim 9, wherein:
the extracting the first feature map and the second feature map further comprises:
employing the differentiable rectification to rectify the first feature map and the second feature map; and
the applying the positional feature enhancement further comprises:
applying the positional feature enhancement to the first rectified feature map and the second rectified feature map.

15. The method of claim 9, wherein the computing the correlation volume further comprises:
flattening the first feature map along height by width of the first feature map to produce a two-dimensional first feature map; and
flattening the second feature map along height by width of the second feature map to produce a two-dimensional second feature map.

16. The method of claim 15, wherein the computing the correlation volume further comprises:
applying a soft-max along the last two dimensions of the correlation volume to convert the correlation volume into a likelihood of the set of likely matches.

17. The method of claim 9, wherein the computing the predicted relative pose further comprises:
flattening the set of likely matches to a one-dimensional list.

18. The method of claim 9, wherein the computing the predicted relative pose further comprises:
orthogonalizing the predicted relative pose using Gram-Schmidt orthogonalization.

19. The method of claim 9, wherein the determining the set of likely matches comprises:
determining a set of likely matches using a decoder layer of the neural network model.

20. The method of claim 9, further comprising:
training the neural network model according to a loss function: $L=\lambda_1 L_{rot}+\lambda_2 L_{flow}$, where $\lambda_1$, $\lambda_2$ are scalar weights, $L_{rot}$ is a pose loss supervised on ground truth calibration data, and $L_{flow}$ is a self-supervised vertical-flow loss.

* * * * *